(12) United States Patent
Tatsuta

(10) Patent No.: US 6,446,866 B1
(45) Date of Patent: *Sep. 10, 2002

(54) INFORMATION REPRODUCING SYSTEM

(75) Inventor: Seiji Tatsuta, Hino (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

This patent is subject to a terminal disclaimer.

(21) Appl. No.: 09/239,439

(22) Filed: Jan. 28, 1999

(30) Foreign Application Priority Data

Feb. 2, 1998 (JP) .......................... 10-020845

(51) Int. Cl.⁷ ................................. G06K 7/10
(52) U.S. Cl. ...................... 235/454; 235/494; 382/181
(58) Field of Search ................ 235/494, 456, 235/462.01; 382/181, 192, 203

(56) References Cited

U.S. PATENT DOCUMENTS

| | | | | | |
|---|---|---|---|---|---|
| 5,101,096 A | * | 3/1992 | Ohyama | ..................... | 235/436 |
| 5,691,527 A | * | 11/1997 | Hara | .......................... | 235/456 |
| 5,866,895 A | * | 2/1999 | Fukuda | ........................ | 235/494 |
| 5,896,403 A | * | 4/1999 | Nagasaki | .................... | 714/752 |
| 5,898,166 A | * | 4/1999 | Fukuda | ........................ | 235/494 |

FOREIGN PATENT DOCUMENTS

| EP | 670555 | * | 6/1995 |
|---|---|---|---|
| EP | 0 717 398 A2 | | 6/1996 |

* cited by examiner

Primary Examiner—Michael G. Lee
Assistant Examiner—Diane J. Lee
(74) Attorney, Agent, or Firm—Frishauf, Holtz, Goodman & Chick, P.C.

(57) ABSTRACT

A representative marker sensing section senses one representative marker from a frame shot by an image input section. A pattern dot sensing section senses pattern dots on the basis of the representative marker. A data dot reading point determining section determines reading points. With this configuration, once one representative marker has been sensed from the imaging frame, pattern dots are sensed on the basis of the representative marker and data reading points are calculated. This not only avoids an adverse effect of the disappearance of markers or the occurrence of erroneous markers and prevents the block data from being partially lost but also reduces the marker sensing process, avoids code reproduction failure, and speeds up the processing.

24 Claims, 20 Drawing Sheets

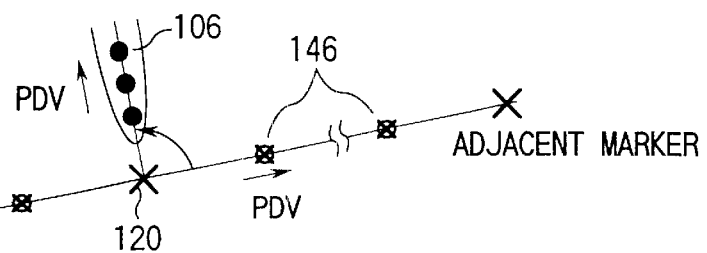
FIG. 27
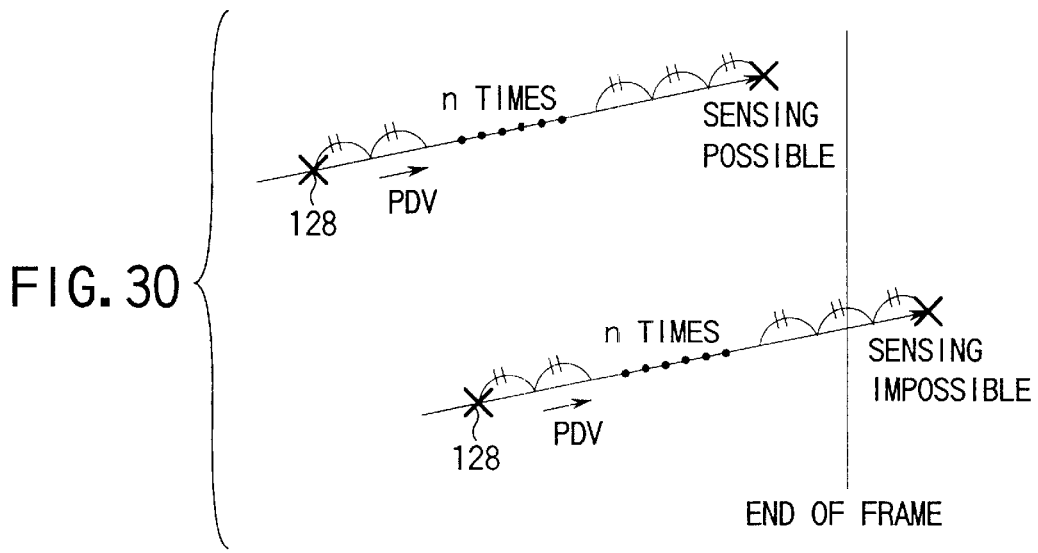
FIG. 30
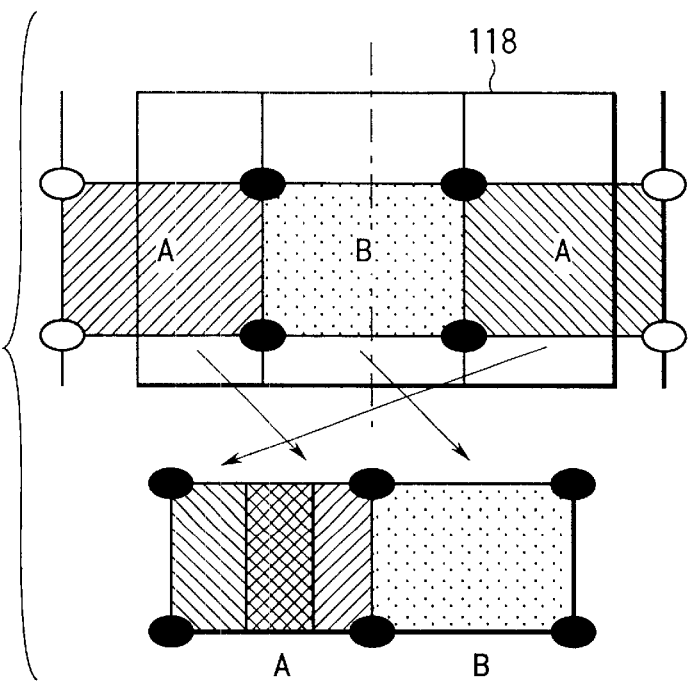
FIG. 32A
FIG. 32B

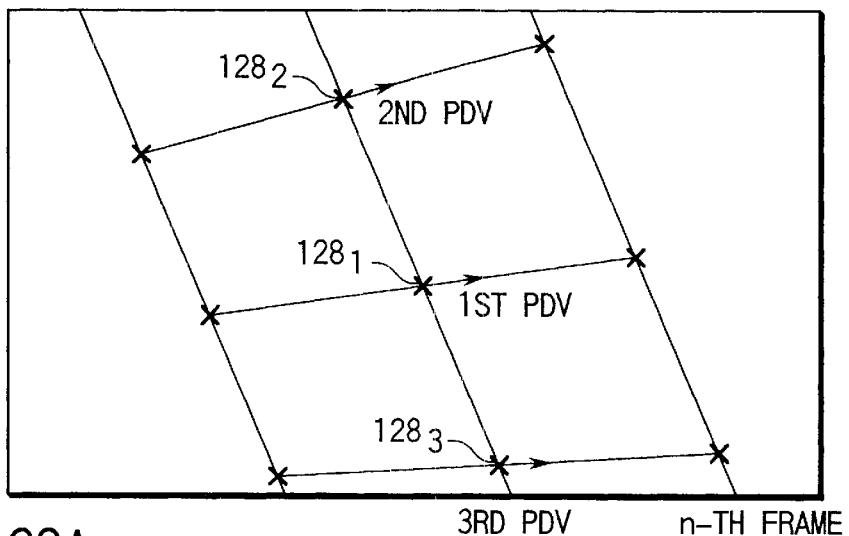
FIG. 28A
| READING REFERENCE POINT | PDV |
|---|---|
| 1ST READING REFERENCE POINT | (7, -3) |
| 2ND READING REFERENCE POINT | (5, -4) |
| 3RD READING REFERENCE POINT | (9, -2) |
→APPLY TO 1ST SENSING REFERENCE POINT
→APPLY TO 2ND SENSING REFERENCE POINT
→APPLY TO 3RD SENSING REFERENCE POINT
FIG. 28B
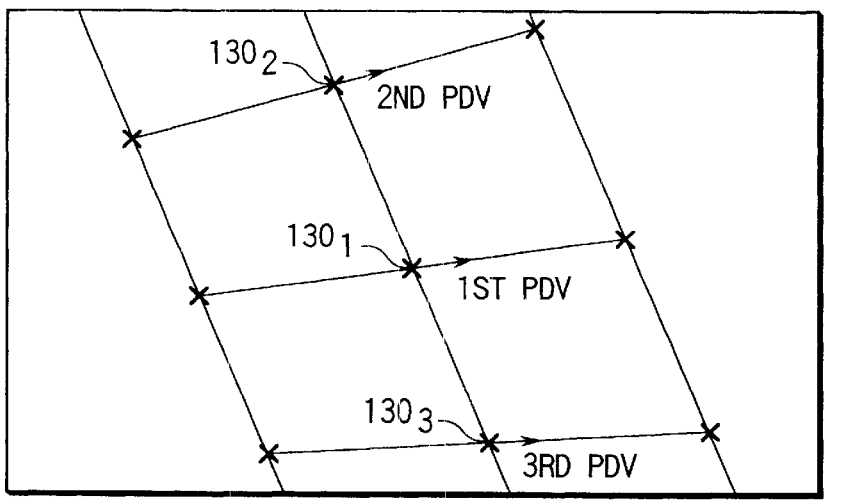
FIG. 28C

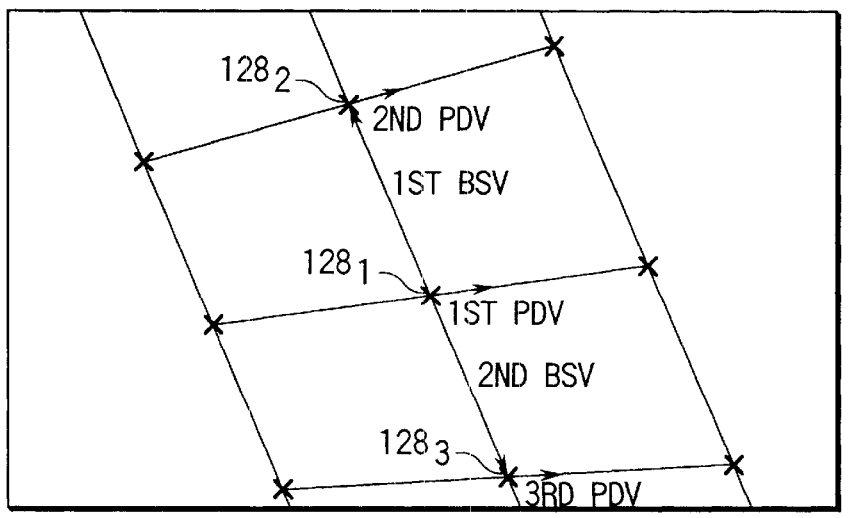
FIG. 29A
| READING REFERENCE POINT | BDV |
|---|---|
| 2ND READING REFERENCE POINT | (−15, −52) |
| 3RD READING REFERENCE POINT | (17, 56) |
→ APPLY TO SETTING OF 2ND SENSING REFERENCE POINT
→ APPLY TO SETTING OF 3RD SENSING REFERENCE POINT
FIG. 29B
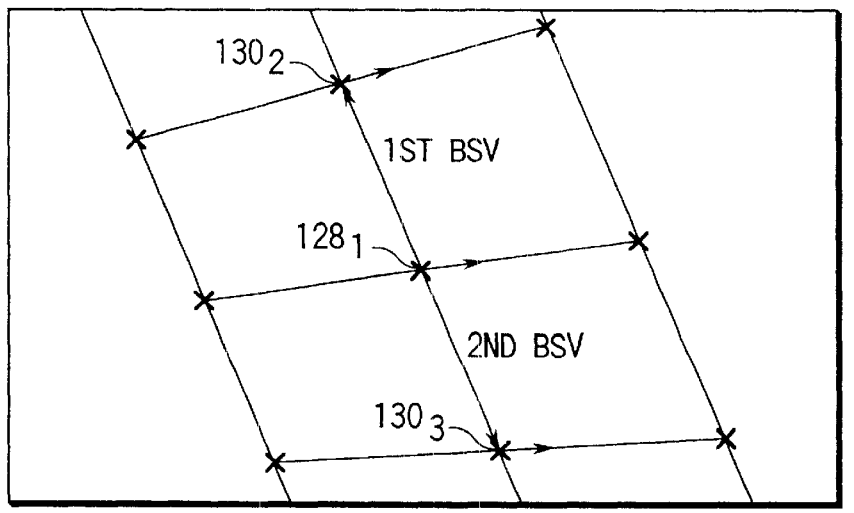
FIG. 29C

INFORMATION REPRODUCING SYSTEM

BACKGROUND OF THE INVENTION

This invention relates to an information reproducing system which reads dot codes from an information recording medium on which dot codes composed of data dots, pattern dots to determine a reading point for each data dot, and markers have been recorded in a specific format in such a manner that they can be read optically. More particularly, this invention relates to an information reproducing system capable of preventing block data from being partially lost due to the disappearance of markers or the occurrence of erroneous markers and reducing the marker sensing process.

The assignee of the present invention has disclosed an information recording medium and information reproducing system in EP 0,717,398 A2 (corresponding to U.S. Ser. No. 08/571,776). The information reproducing system has optically read dot codes from an information recording medium on which dot codes composed of data dots, pattern dots to determine the reading point for each data dot, and markers have been recorded. The system has then reproduced the information corresponding to the data dots, the information including audio data, video data, and text data.

In the information reproducing system, a block is composed of data dots, pattern dots, and markers larger than those. One marker is first sensed from the imaging screen and another marker adjacent to the marker is sensed using the first sensed marker as a reference. Using pattern dots between the two sensed markers, reading points for data items in a block are determined. Each data dot is read at the each reading point to reproduce information. Because the reading points for data items in a block are determined using markers and pattern dots constituting a block and the data is read and reproduced, the system is excellent in the reliability of reading densely recorded data and has the great advantage that it is immune to distortion and that it can read even when the imaging device has lifted from or tilted to the recording medium because of manual scanning.

Although the effect of determining the reading points for data items in a block using markers and pattern dots constituting a block and reading data items is great, particular attention should be given to the disappearance of markers and the occurrence of erroneous markers.

To overcome the problems, a system for sensing a first target marker near the center of the imaging screen, a system for limiting an adjacent marker sensing area on the basis of a format, and a system for removing erroneous markers on the basis of marker pairs have been disclosed in EP 0,717,398 A2. Those systems prevent the block data from being partially lost due to the disappearance of markers or the occurrence of erroneous markers and avoid code reproduction failure.

Measures to deal with the disappearance of markers or the occurrence of erroneous markers leave ample room for improvement.

For instance, a recording medium having coated surface is likely to perform regular reflection, moving a luminous point to the marker. Consequently, the marker cannot be detected, making it impossible to read the data in a block that includes the marker. As a result, the block data is inevitably lost. This may cause a code reproduction failure. Furthermore, shading in the periphery of the imaging screen deforms dots. As a result, a pattern similar to a marker is imaged in the data dot recording area in the periphery of the imaging screen. Such pattern is an erroneous marker and may also cause a code reproduction failure. Moreover, because any marker used is larger in area than a dot, it is susceptibly to the influence of poor recording or a flaw in the surface of the recording medium. Therefor, the marker may not be detected even if data dots have been correctly recorded.

BRIEF SUMMARY OF THE INVENTION

The object of the present invention is to provide an information reproducing system capable of not only preventing the block data from being partially lost due to the disappearance of markers or the occurrence of erroneous markers but also reducing the marker sensing process.

According to an aspect of the present invention, there is provided an information reproducing system which optically reads a dot code from an information recording medium and reproduces information, the information recording medium on which an optically readable dot code has been recorded, the dot code composed of blocks arranged in array, each block including at least a data code made up of data dots arranged according to the contents of data related to information to be reproduced, a pattern code placed so as to have a specific positional relationship with the data dots and made up of pattern dots to determine reading points for the data dots, and markers to sense the pattern dots placed so as to have a specific positional relationship with the pattern dots and recorded in a manner different from the data dots and the pattern dots, the information reproducing system comprising:

image input means for shooting the dot code on the information recording medium;

representative marker sensing means for sensing one of the markers on the image shot by the image input means;

pattern dot sensing means for sensing the pattern dots on the basis of the position of the representative marker sensed by the representative marker sensing means;

data dot reading point determining means for determining a reading point for each data dot on the basis of the positions of the pattern dots sensed by the pattern dot sensing means;

data reading means for reading each data dot at the reading point determined by the data dot reading point determining means; and data reproducing means for concatenating the data items in each block read by the data reading means and reproducing the information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 27 is a diagram to help explain a method of determining the direction of block by sensing a direction indication dot in the third embodiment;

FIG. 28A shows the relationship between reading reference values in an n-th frame to help explain a method of selectively applying pattern dot reading vectors in sensing pattern dots in the third embodiment;

FIG. 28B shows the storage structure of a reading reference value storage table to help explain a method of selectively applying pattern dot reading vectors in sensing pattern dots in the third embodiment;

FIG. 28C shows the relationship between reading reference values in an (n+1)-th frame to help explain a method of selectively applying pattern dot reading vectors in sensing pattern dots in the third embodiment;

FIG. 29A shows the reading reference values and block skip vectors in an n-th frame to help explain a method of selectively applying block skip vectors in setting a sensing reference point in the third embodiment;

FIG. 29B shows the storage structure of a block skip vector storage table to help explain a method of selectively applying block skip vectors in setting a sensing reference point in the third embodiment;

FIG. 29C shows the reading reference values and block skip vectors in an (n+1)-th frame to help explain a method of selectively applying block skip vectors in setting a sensing reference point in the third embodiment;

FIG. 30 is a diagram to help explain a method of judging whether or not pattern dots can be sensed;

FIG. 32A shows the arrangement of blocks in the fourth embodiment;

FIG. 32B is a diagram to help explain the division reading of blocks;

DETAILED DESCRIPTION OF THE INVENTION

Hereinafter, referring to the accompanying drawings, embodiments of the present invention will be explained.

[First Embodiment]

Figure 1:
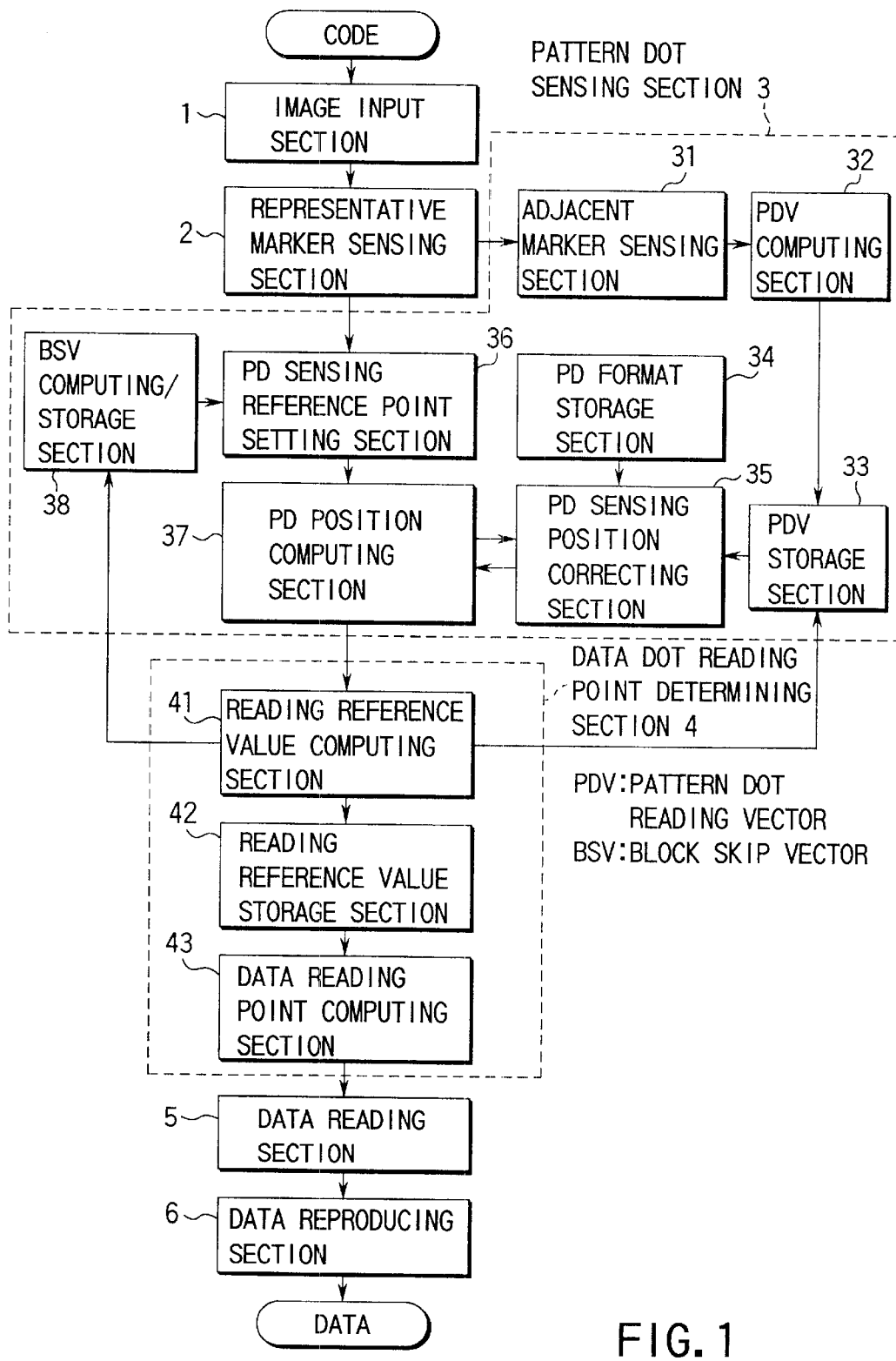
FIG. 1 is a block diagram of an information reproducing system according to a first embodiment of the present invention.

FIG. 1 shows the configuration of an information reproducing system according to a first embodiment of the present invention. The information reproducing system of the first embodiment comprises an image input section 1, a representative marker sensing section 2, a pattern dot (hereinafter, abbreviated as PD) sensing section 3, a data dot reading point determining section 4, a data reading section 5, and a data reproducing section 6. The PD sensing section 3 is composed of an adjacent marker sensing section 31, a pattern dot reading vector (hereinafter, abbreviated as PDV) computing section 32, a PDV storage section 33, a PD format storage section 34, a PD sensing position correcting section 35, a PD sensing reference point setting section 36, a PD position computing section 37, and a block skip vector (hereinafter, abbreviated as BSV) computing/storage section 38. The data dot reading point determining section 4 is composed of a reading reference value computing section 41, a reading reference value storage section 42, and a data reading point computing section 43.

The operation of the information reproducing system constructed as described above will be explained.

Figure 2:
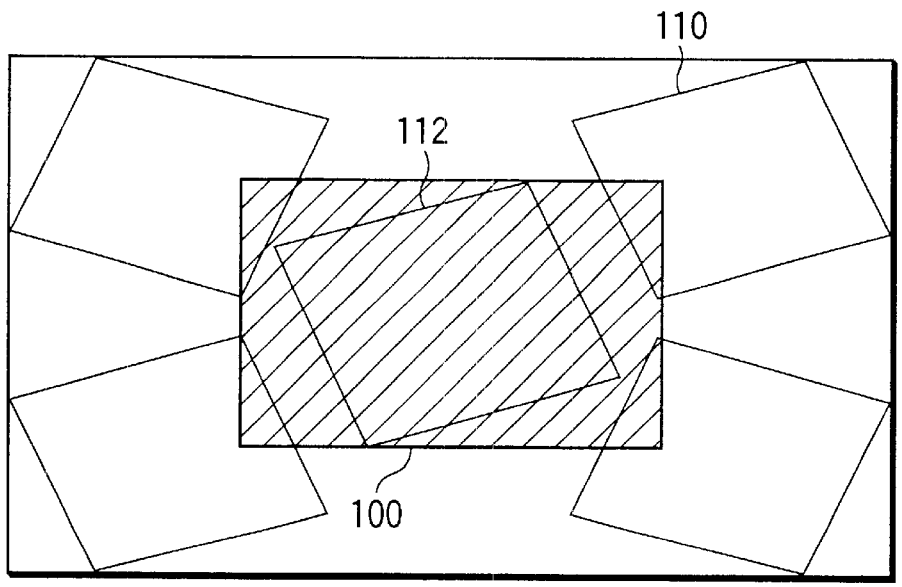
FIG. 2 is a diagram to help explain a search range for a representative marker in the first embodiment.
Figure 3:
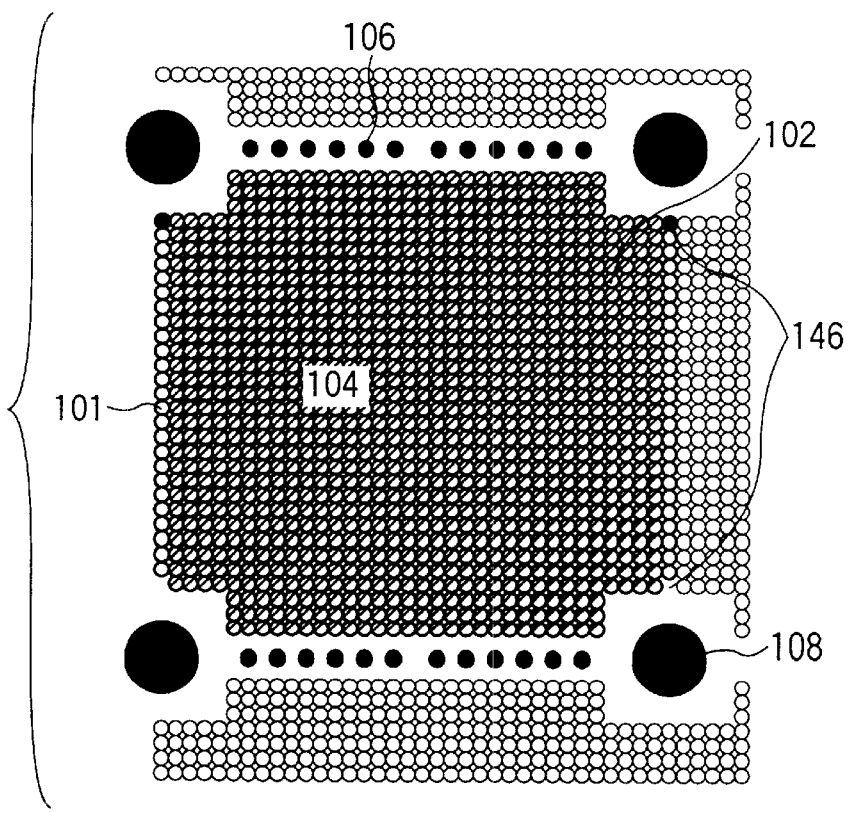
FIG. 3 shows an example of the structure of a block constituting a code in the first embodiment.

The image input section 1 causes an imaging device, such as a CCD, to shoot a dot code in which data dots, markers, and pattern dots have been optically recorded in a specific format and convert the image data into an electric signal. The representative marker sensing section 2 receives the signal from the image input section 1 and senses one marker in, for example, a representative marker search range 100, as shown in FIG. 2. A dot code to which the information reproducing system of the first embodiment is applied is, for example, an optically readable dot code where more than one block as shown in FIG. 3 is arranged. Specifically, a block includes at least a block header 101 that carries address information, block data 104 composed of data dots 102 arranged according to the contents of data about the information to be reproduced, a pattern code placed so as to have a specific positional relationship with the data dots 102 and composed of pattern dots 106 to determine reading points for each data dot 102, and markers 108 placed so as to have a specific positional relationship with the pattern dots 106 and recorded in a different manner (in terms of size, shape, and color) from the data dots 102 and pattern dots 106 to detect the pattern dots 106.

Figure 4:
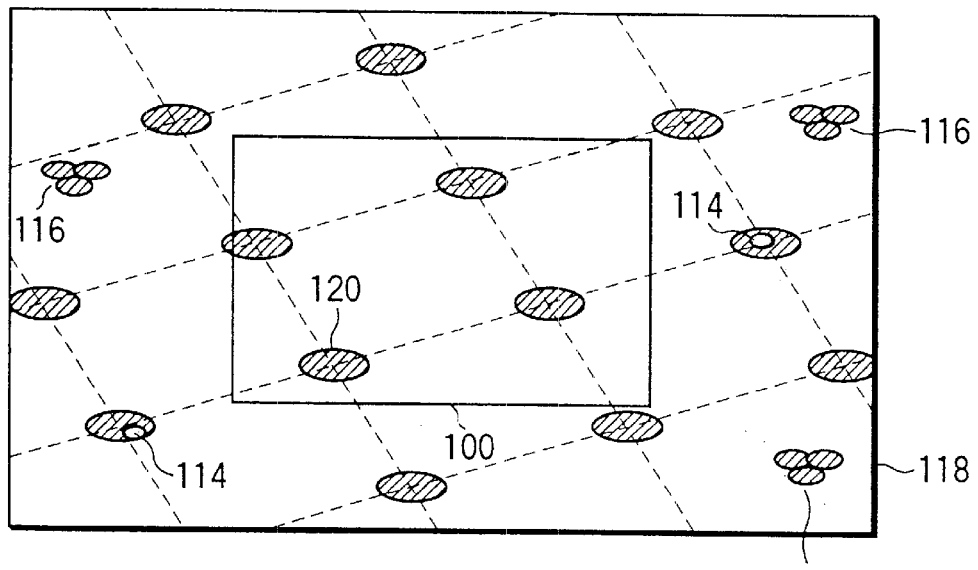
FIG. 4 is a diagram to help explain a method of sensing a representative marker in the first embodiment.

Taking into account optical magnification, the aspect ratio of CCD pixels, and allowed skew angle for a code constructed as described above, the representative marker search range 100 is set so that it may not be present in the readable state outside the search range even in the minimum block 110 to be imaged as shown in FIG. 2 and all of the search range may not be included even in the maximum block 112. As a result, when no marker 108 is not sensed in the representative marker search range 100, this means that there is no block to be read in the imaging screen (frame). For example, as shown in FIG. 4, a loss 114 in a marker due to regular reflection or an erroneous marker 116 due to shading is liable to occur in the periphery of a frame 118. To overcome the shortcoming, the necessary minimum area in the middle of the frame 118 is set as the representative marker search range 100. This prevents the influence of the disappearance of markers or the occurrence of erroneous markers, thereby making it possible to sense a representative marker 120 reliably. Making an area to be sensed smaller than all of the frame 118 shortens the time required for sensing, which helps make the processing speed faster. FIG. 2 and FIG. 4 show cases where the aspect ratio of the imaging element is not 1 (or traverse sampling is more precise).

Figure 5:
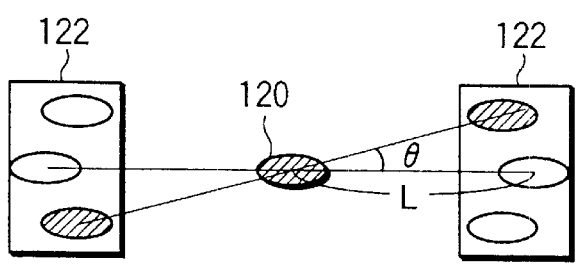
FIG. 5 is a diagram to help explain a method of sensing adjacent markers in the first embodiment.

As described later, when a PDV has not been calculated yet, the result of sensing the representative marker 120 is given to the adjacent marker sensing section 31 of the PD sensing section 3. As shown in FIG. 5, the adjacent marker sensing section 31 calculates an adjacent marker search range 122 from the inter-marker distance L determined by the format of the dot code, allowed skew angle θ, and the position of the representative marker 120 and senses an adjacent marker in the search range 122. Furthermore, to eliminate erroneous markers, a known method of using marker pairs as disclosed in EP 0,717,398 A2 may be used. When the inter-marker distance L determined by the format has an allowance, the inter-marker distance L may be estimated from the size of the sensed representative marker 120. For example, in the case of the structure of a block as shown in FIG. 3, the diameter of the marker is five times the diameter of a dot constituting a data dot 102 or a pattern dot 106 and the length of one side of the block is 35 times that of the dot. Therefore, if the diameter of the sensed representative marker 120 is D, this will give:

$$L=(35/5)D=7D.$$

As described above, searching an adjacent marker in the necessary minimum area prevents the influence of the disappearance of markers or the occurrence of erroneous markers, which makes it possible to sense an adjacent marker reliably. Moreover, narrowing the area in which an adjacent marker is to be searched shortens the time required for sensing, helping increase the processing speed.

Figure 6:
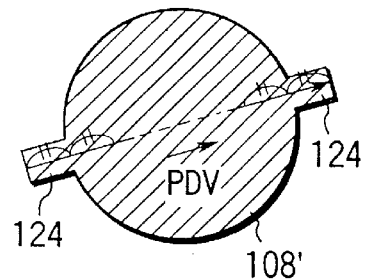
FIG. 6 is a diagram to help explain a method of setting a pattern dot reading vector using the representative marker in the first embodiment.

Furthermore, the skew angle can be fixed by manual scanning along a guide during code scanning. In such a case, because L is determined from the size of the representative marker 120 as described in the aforementioned example, a PDV can be calculated without searching for adjacent markers. Giving anisotropy to the shape of the marker 108 enables the size and direction of the marker to be found, which makes it possible to calculate a PDV. For example, as shown in FIG. 6, in the case of a marker 108' with a rectangular portion 124 extending with a width of n dots in the direction of a PDV, the rectangular portion 124 is sensed after a representative marker has been sensed. In the direction of its long side, a vector 1/n of the length of the long side can be set as a PDV.

Figure 7:
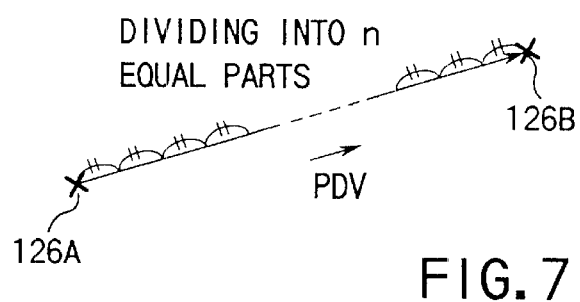
FIG. 7 is a diagram to help explain a method of setting a pattern dot reading vector in the first embodiment.

The result of the adjacent marker sensing section 31 sensing adjacent markers and that of the representative marker sensing section 2 sensing the representative marker 120 are given to the PDV computing section 31. As shown in FIG. 7, the PDV computing section 32 divides the space between the representative point in the sensed representative marker 120 and that in an adjacent marker into n equal parts (n is the number of dots between markers), thereby calculating a PDV. As a representative point for the marker, for example, a near center, such as the centroid or the intersection of diagonals of a circumscribed quadrilateral may be used. In the first embodiment, it is therefore assumed that the space between the representative marker near-center 126A and the adjacent marker near-center 126B is divided into n equal parts and then a PDV is calculated.

The calculated PDV is given to the PDV storage section 33, which stores it for subsequent pattern dots sensing. Setting a PDV in the PDV storage section 33 on the basis of the position of an adjacent marker enables pattern dots to be sensed reliably at the time of starting to image a code.

Figure 8A:
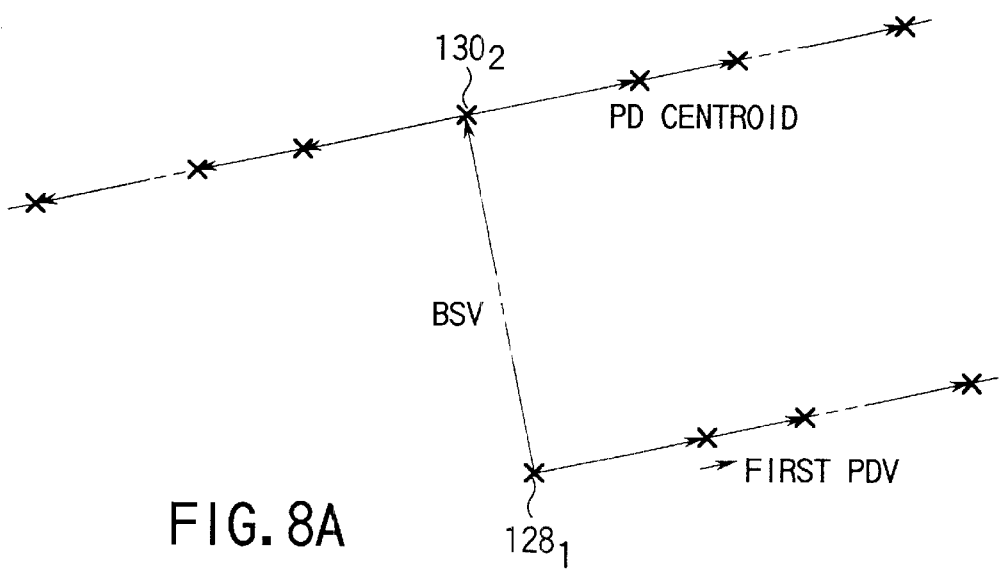
FIGS. 8A and 8B are diagrams to help explain a method of calculating a second reading reference point in the first embodiment.
Figure 8B:
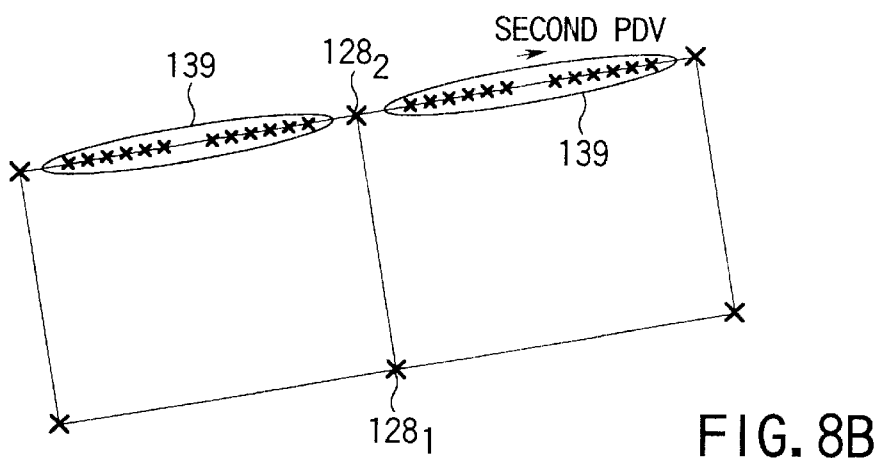
Figure 9:
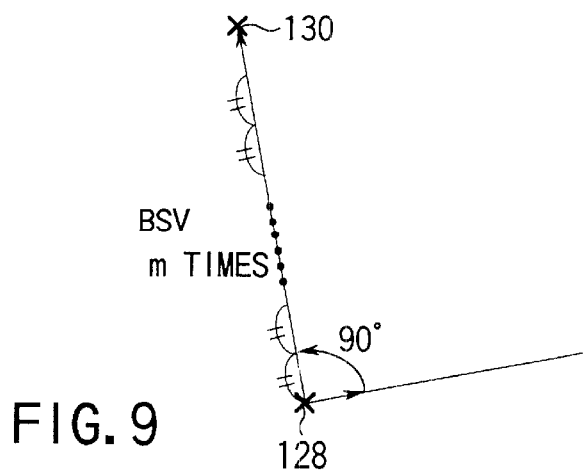
FIG. 9 is a diagram to help explain a method of calculating a block skip vector and setting a pattern dot sensing reference point in the first embodiment.

Next, the PD position computing section 37 senses pattern dots according to the PDV stored in the PDV storage section 33 on the basis of the PD sensing reference points set in the PD sensing reference point setting section 36 and calculates the position of the centroid of each pattern dot. The PD sensing reference point setting section 36 first sets the near center 126A of the representative marker 120 sensed at the representative marker sensing section 2 as a first PD sensing reference point, calculates a reading reference point $128_1$ and a reading reference vector for reading data dots 102. Thereafter, as shown in FIGS. 8A and 8B, the section 36 sets a point determined from a BSV calculated from the reading reference vector and the reading reference point $128_1$ as an m-th (>1) PD sensing reference point $130_m$. In the block structure as shown in FIG. 3, the BSV computing/storage section 38 rotates a PDV to the other side of the block (through 90° in the figure) as shown in FIG. 9 and multiplies it by m (m is the number of dots between sensing reference points), thereby determining a BSV.

The processes ranging from sensing a PD to calculating a reading reference point and a reading reference vector will be explained by reference to a reading reference value calculating flowchart in FIG. 10. Explanation will be given, provided that the PD format is as shown in FIG. 11.

Figure 12:
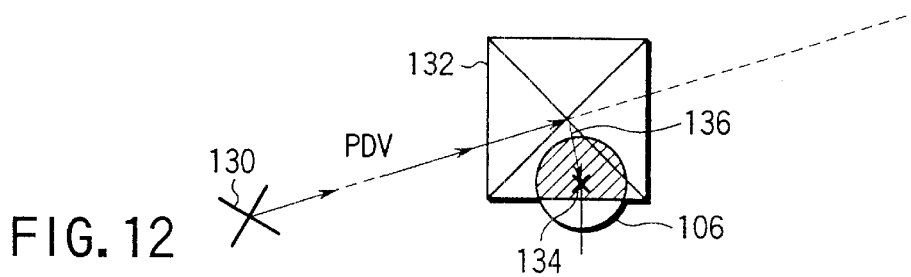
FIG. 12 is a diagram to help explain a method of correcting the sensing position using pattern dots in the first embodiment.
Figure 13:
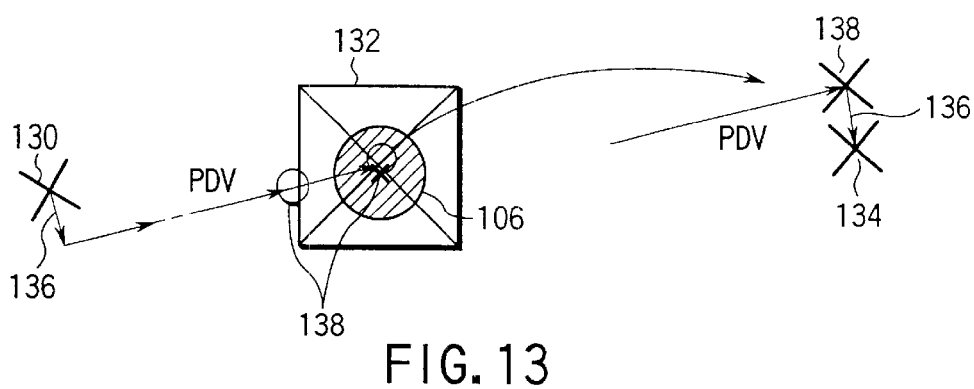
FIG. 13 is a diagram to help explain the operation of sensing pattern dots and correcting the sensing position in the first embodiment.

First, referring to the PD format stored in the PD format storage section 34, the sensing point is moved from the PD sensing reference point 130 to the position in which a pattern dot 106 exists according to a PDV as shown in FIG. 12. Using the new sensing point as the center, a mask 132 having an area about four times as large as a dot is applied. Then, the centroid of the pattern dot 106 sensed in the mask 132 is calculated. The PD sensing position correcting section 35 moves the PD sensing point to the calculated centroid position 134. The movement is used as a PD sensing position correcting vector 136 and added to the PD sensing reference point 130 as shown in FIG. 13. Then, pattern dots 106 are sensed, starting from the first one. On the basis of the first sensed pattern dot 106, the PD sensing position is corrected and then pattern dots 106 are sensed again. This enables pattern dots 106 to be sensed reliably and the centroid of the first sensed pattern dot 106 to be determined correctly even when the accuracy of the PD sensing reference point 130 or that of a PDV is not so high and part of the pattern dot 106 sticks out of the mask 132 as shown in FIG. 12.

Figure 14:
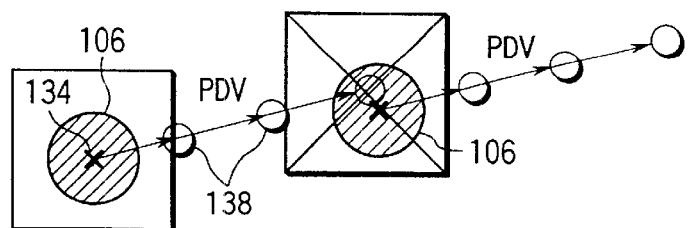
FIG. 14 is a diagram to help explain the operation of sensing pattern dots and correcting the sensing position in the first embodiment.

Then, as the sensing point 138 is shifted sequentially, it is judged whether any pattern dot 106 exists at the sensing point 138. When a pattern dot 106 that agrees with the format has been found, the centroid of the pattern dot 106 is determined as shown in FIG. 13. The PD sensing position correcting vector 136 is updated so that the PD sensing point 138 may move to the determined centroid 134. This operation is repeated each time a pattern dot 106 is sensed as shown in FIG. 14. Although the centroid of a PD may be determined again by applying a mask as in the first pattern dot after the PD sensing position correcting vector has been updated, the recalculation of the centroid is not made because the amount of shift is considered to be not too large. By updating the PD sensing position correcting vector each time a pattern dot 106 is sensed and correcting the next PD sensing position, pattern dots 106 are sensed reliably and the centroid of the each pattern dot 106 is determined correctly even when the accuracy of the PD sensing reference point 130 or that of the PDV is not too high. When a pattern dot that agrees with the format has not been sensed or a pattern dot that disagrees with the format has been sensed, they are considered to be errors and an error process is carried out. For example, in the reading reference value calculating flowchart in FIG. 10, an error value Err is incremented.

Then, on the basis of a train of PD centroids determined until the last pattern dot 106 has been sensed, the reading reference value calculating section 41 in the data dot reading point determining section 4 calculates a reading reference point 128 or a reading reference value and a reading reference vector. At this time, if the error value Err is equal to or larger than a specific threshold value N, the sensing of pattern dots 106 will be considered to be unsuccessful.

Figure 10:
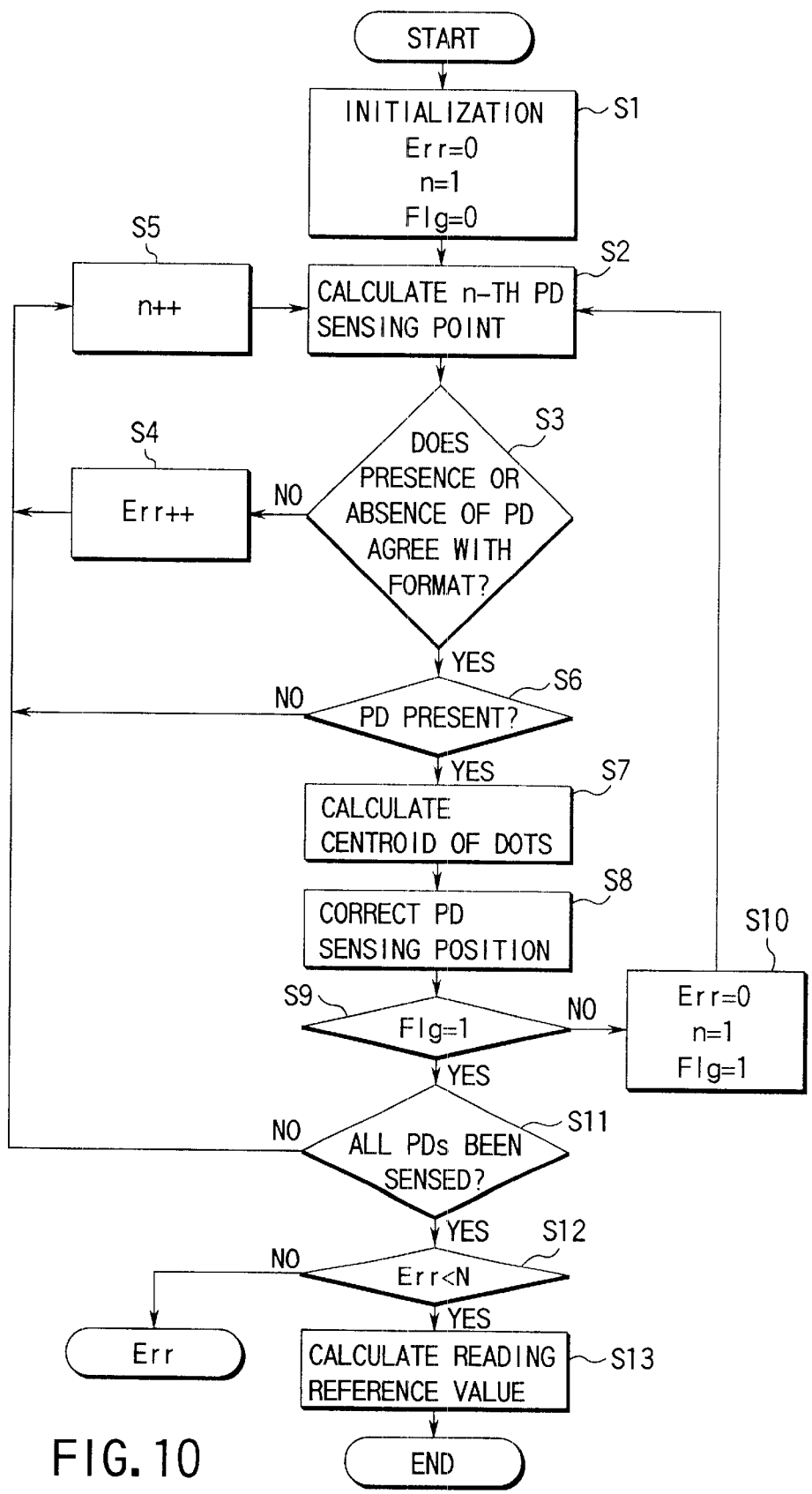
FIG. 10 is a flowchart for the operation of calculating a reading reference value in the first embodiment.
Figure 11:
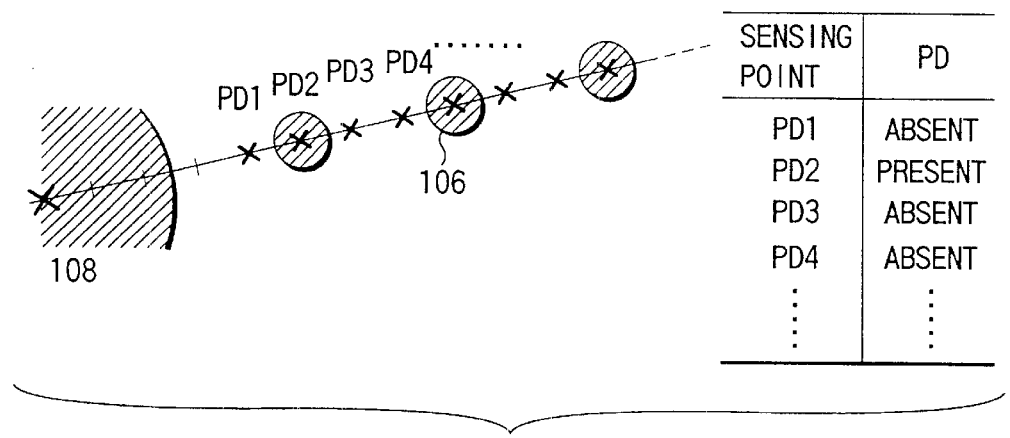
FIG. 11 is a diagram to help explain the format for a pattern code in the first embodiment.

The flow of the overall processing will be shown in FIG. 10.

First, error value Err and PD sensing position corrected flag Flg are initialized to 0 and the sensing point number n to 1 (step S1). Then, from the PD sensing reference point 130 and PDV, an n-th PD sensing point 138 is calculated (step S2) and a check is made to see if the presence or absence of a pattern dot 106 agrees with the format (step S3). If it disagrees with the format, error value Err will be incremented (step S4), the sensing point number n be incremented (step S5), and control will return to step S2.

If the presence or absence of a PD 106 agrees with the format, it will be judged whether a pattern dot 106 will be present (step S6). If there is no pattern dot 106, control will proceed to step S5. If there is a pattern dot 106, the centroid of dot will be calculated (step S7) and the PD sensing position be corrected (step S8). Then, the PD sensing position corrected flag Flg is checked (step S9). If the PD sensing position corrected flag Flg is 0, the PD sensing position will be corrected for the first time and therefore the sensing point number n and error value Err be initialized to 0 and the PD sensing position corrected flag Flg be set to 1 (step S10), and control will return to step S2. This enables a pattern dot 106 to be sensed again correctly after the PD sensing position has been corrected.

If at step S9, the PD sensing position corrected flag Flg is 1, a check will be made to see if all of the pattern dots 106 in the pattern code have been sensed (step S11). If not, control will proceed to step S5.

Then, if all of the pattern dots 106 in the pattern code have been sensed, it will be judged whether error value Err is smaller than the specific threshold value N (step S12). If it is larger, it will be judged that an inappropriate code has been read and the error process be carried out. If it is smaller, it will be judged that a relevant code has been read. Then, a reading reference value will be calculated from the read PD centroid train (step S13).

Figure 15A:
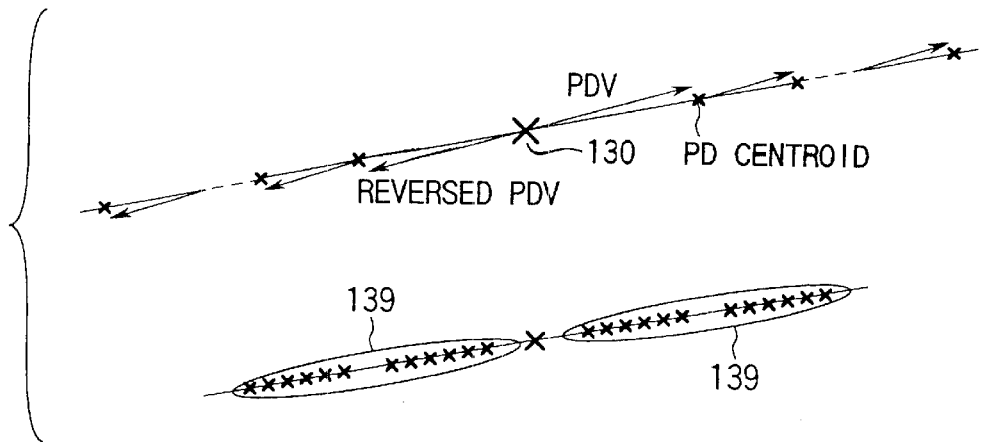
FIGS. 15A and 15B are diagrams to help explain a method of calculating a reading reference value in the first embodiment.
Figure 15B:
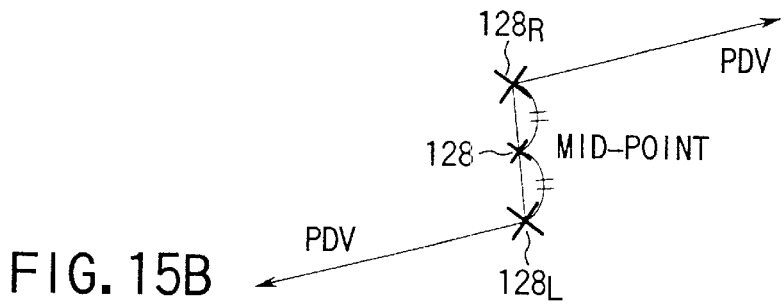

As shown in FIG. 15A, the operation is performed on two pattern codes sharing the PD sensing reference point 130. As a result, one setting of the PD sensing reference point 130 enables two reading reference points and two reading reference vectors to be calculated, which improves efficiency in calculation. Originally, two reading reference points should be the same point. Even if they have different calculated values, the accuracy can be improved by averaging the two reading reference points $128_R$, $12_L$ to produce a reading reference point 128 as shown in FIG. 15B. When the distortion is small, the sign of the reading reference vector may be reversed and averaged, thereby improving the storage efficiency of PDV in the reading reference value storage section 42 and PDV storage section 33.

Figure 16A:
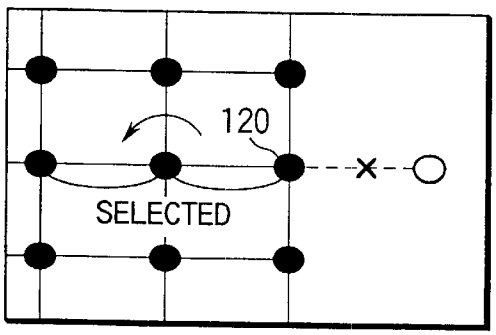
FIGS. 16A and 16B are diagrams to help explain a method of calculating a reading reference value in the first embodiment.
Figure 16B:
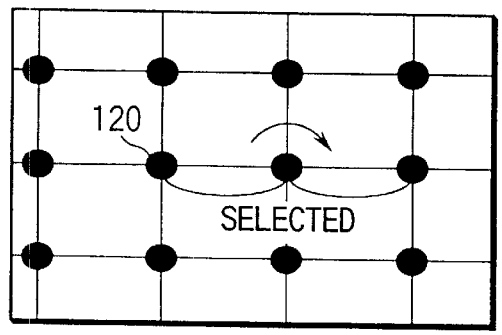

As shown in FIG. 16A, it is judged the results of reading two pattern codes sharing the PD sensing reference point 130. If pattern dots 106 has been sensed properly only from one pattern code (at left in the figure), the PD reference point 130 may be moved by one block to the correctly sensed side and another PD 106 be sensed from a pattern code adjacent to the sensed side. Alternatively, when pattern dots 106 have been sensed correctly from both codes, it may be judged whether they have clustered on one of the frames. If they have clustered on one frame, the PD sensing reference point 130 may be shifted by one block to the other frame (to the right side in the figure), pattern dots 106 be further sensed from an adjacent pattern code, and two pattern codes close to the center of the screen be selected.

Next, a method of calculating a reading reference value will be explained. A method of calculating a reading reference value by a least square error scheme will be described. It goes without saying that other known methods may be used.

Figure 17:
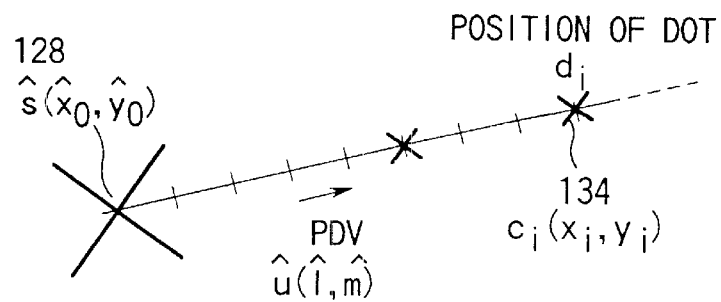
FIG. 17 is a diagram to help explain a method of calculating a reading reference value in the first embodiment.

As shown in FIG. 17, if the position (the number of dots) of an i-th PD 106 from the reading reference point 128 is $d_i$, the observed position of its centroid 134 is $c_i(x_i, Y_i)$, the estimated reading point 128 is $\hat{S}(\hat{x}_o, \hat{y}_o)$, and the estimated reading reference vector is $\hat{u}(\hat{l}, \hat{m})$, the position $\hat{c}_i$ of the estimated i-th PD will be:

$$\hat{c}_i = \hat{S} + d_i \hat{u} \qquad (1)$$

An error $\epsilon_i$ in the observed dot position $c_i$ is:

$$\epsilon_i = \|\hat{c}_i - c_i\| \quad (2)$$

Finding the square sum of $\epsilon_i$ for all of the observed black dots gives:

The following equations hold for $\hat{x}_0, \hat{l}$ that minimize E:

From equation (4) and equation (5),

Solving these equations gives:

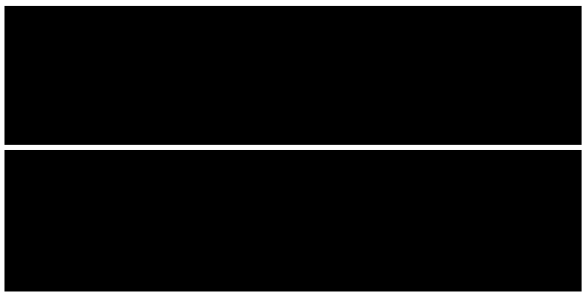

Similarly,

In this way, two reading reference values, the reading reference point $\hat{S}(\hat{x}_0, \hat{y}_0)$ and the reading reference vector $\hat{u}(\hat{l}, \hat{m})$, are determined at the same time.

Thereafter, the reading reference value determined by the aforementioned process using the near center of the representative marker 120 as the PD sensing reference point 130 is stored as a first reading reference value $128_1$ into the reading reference value storage section 42. To calculate the reading reference values for the pattern codes facing each other with a block between the codes, a BSV is computed from the first reading reference value. As shown in FIG. 8A, a second PD sensing reference point $130_2$ is set according to the BSV. Thereafter, pattern dots are sensed as described above. From the determined PD centroid train 139, the second reading reference value corresponding to the second reading point $128_2$ is calculated as shown in FIG. 8B. In this way, on the basis of the calculated reading reference value, the BSV is calculated and a new PD sensing reference point 130 is set. This makes it possible to sense pattern dots 106 reliably without sensing markers except for the representative marker 120.

Figure 18:
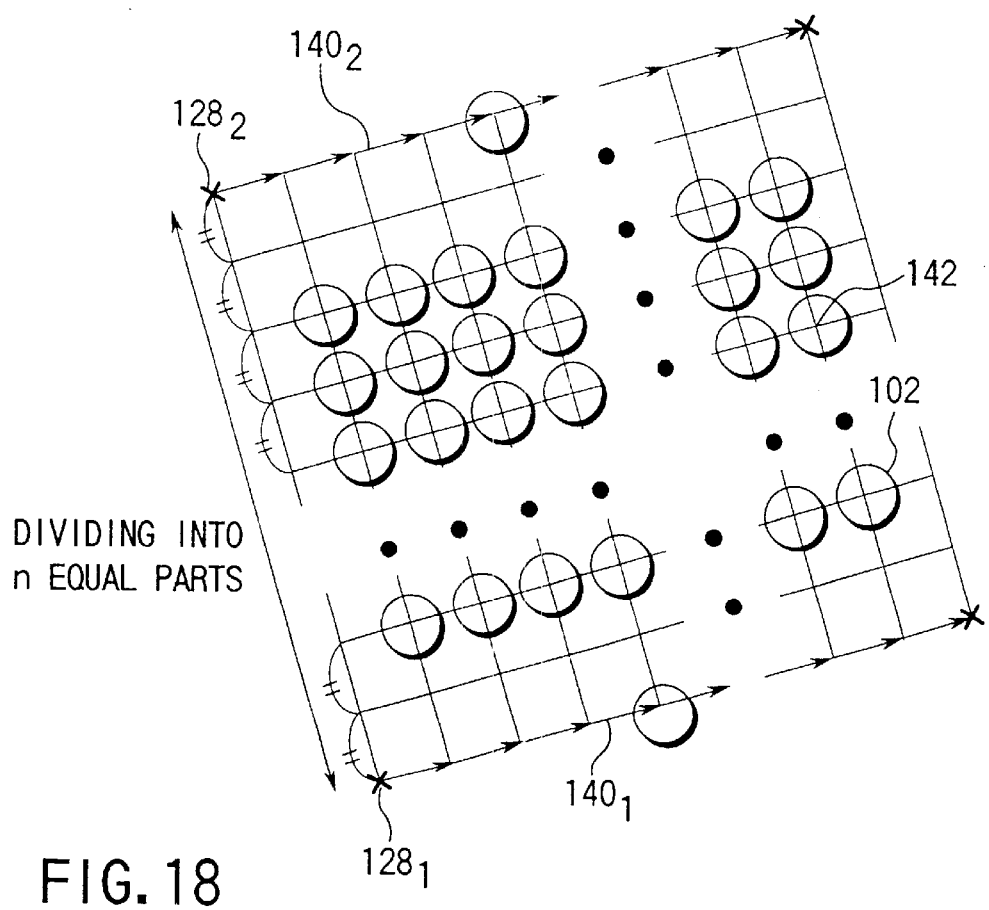
FIG. 18 is a diagram to help explain a method of reading block data in the first embodiment.

Then, the data reading point calculating section 43, as shown in FIG. 18, moves the dot sensing points from the first and second reading reference points $128_1, 128_2$ according to a first and a second reading reference vector $140_1, 140_2$. The section 43 then divides the space between the dot sensing points into n equal parts (n is the number of dots between markers) and calculates data reading points 142.

As described above, the reading points 142 for the block data 104 is calculated from a plurality of reading reference points 128 and reading reference vectors 140. This enables data dots 102 to be sensed easily and reliably even when the distortion of an image due to the lifting or tilting of the imaging device is great.

Figure 19:
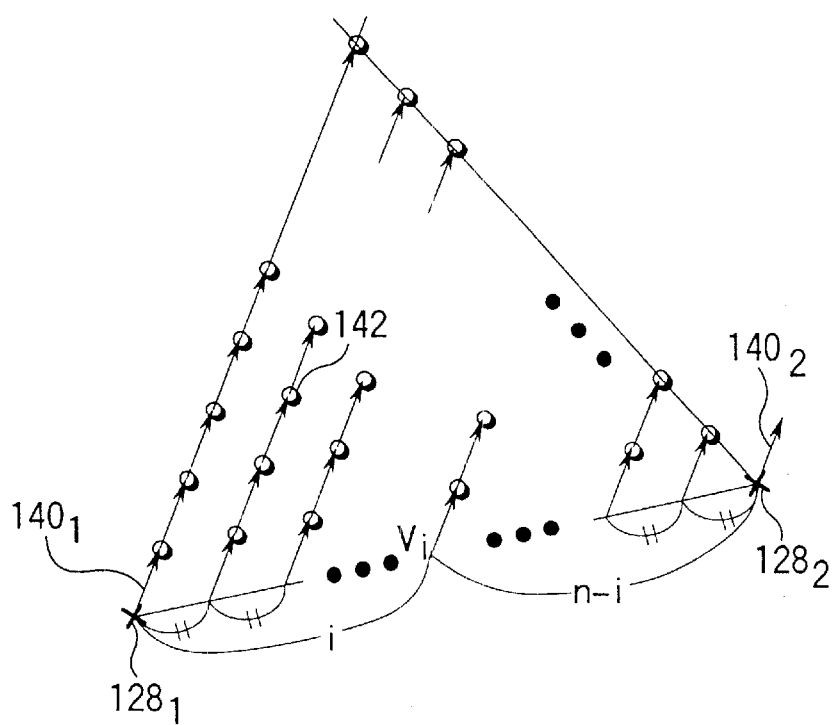
FIG. 19 is a diagram to help explain a method of reading block data in the first embodiment.

Furthermore, even when a block is not rectangular, for example, when a block is triangular as shown in FIG. 19, the space between two reference points $128_1, 128_2$ is divided into as many equal parts as a number of dots determined by the format. Using the equally divided points as starting points, the data reading point 142 is moved according to vectors $140_1, 140_2$. The vectors $140_1, 140_2$ are determined by adding a reference vector according to the ratio of the distance to the respective reference points $128_1, 128_2$. For example, vector $V_i$ in FIG. 19 is determined as follows:

where $V_{S1}$ is the first reading reference vector and $V_{S2}$ is the second reading reference vector.

When the distortion is sufficiently small, the first reading reference vector $140_1$ and the second reading reference vector $140_2$ are the same and the second reading reference point $128_2$ is calculated easily from the first reading reference point $128_1$ and the first reading reference vector $140_1$. Therefore, determining only the first reading reference value enables all the data reading points 142 in the imaging screen to be calculated, which helps achieve higher-speed processing.

Figure 20:
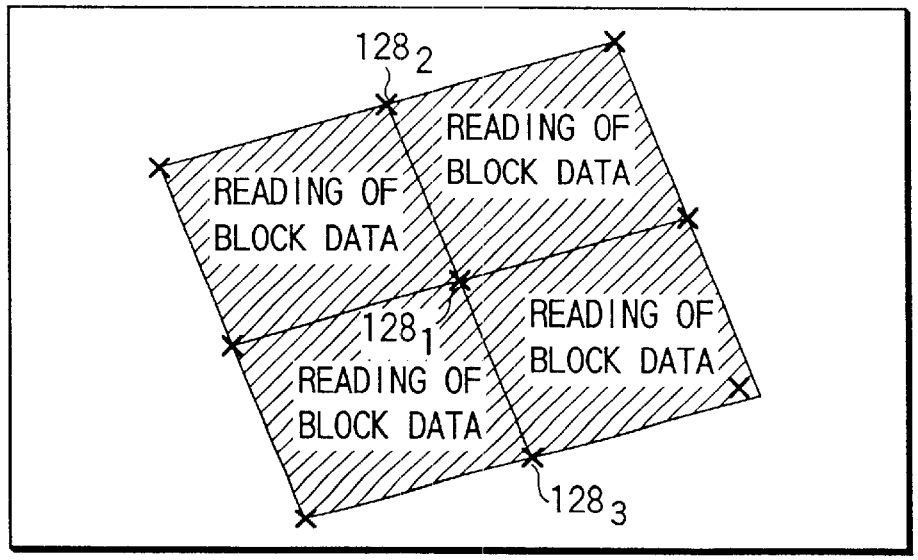
FIG. 20 is a diagram to help explain a method of reading the block data in a frame in the first embodiment.

The data reading section 5 reads data dots 102 at the calculated data reading points 142. As shown in FIG. 20, the reading section 5 sequentially reads data items in the block sandwiched by two reading reference points. The flow of those processes is shown in FIG. 21.

Figure 21:
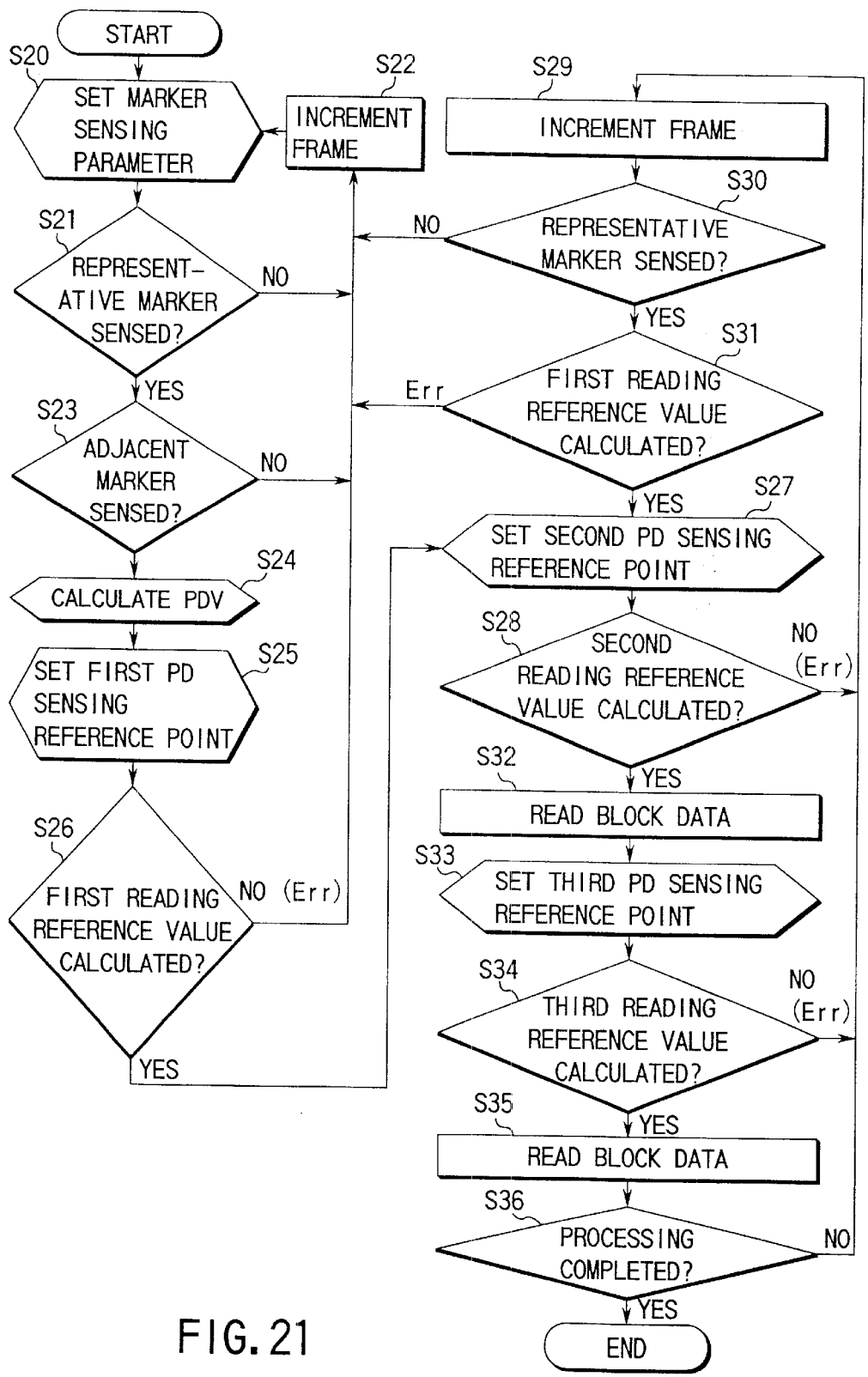
FIG. 21 is a flowchart for the operation of reading data in the first embodiment.

In FIG. 21, a parameter to sense a marker 108 is set (step S20). If a representative marker 120 is not sensed according to the parameter (step S21), the next frame will be processed (step S22) and control will return to step S20.

If a representative marker 120 has been sensed, an adjacent marker will be sensed on the basis of the representative marker 120. If it has not been sensed (step S23), control will proceed to step 22. If an adjacent marker has been sensed, a PDV will be calculated from the representative marker and adjacent marker (step S24) and a first PD sensing reference point 1301 will be set on the basis of the representative marker 120 (step S25). Thereafter, the first reading reference value is calculated. If it cannot be calculated (step S26), control will proceed to step S22.

If the first reading reference value has been calculated, a second PD sensing reference point 130₂ will be set (step S27) and the second reading reference value be calculated. If it cannot be calculated (step S28), the next frame will be processed (step S29). Then, if a representative marker 120 has not been sensed in the frame (step S30), control will proceed to step S22, where the next frame will be processed. If a representative marker 120 has been sensed, the first reading reference value will be calculated. If it cannot be calculated (step S31), control will go to step S22. If the first reading reference value has been calculated, control will proceed to step S27.

Then, if at step S28, the second reading reference value has been calculated, the block data 104 will be read (step S32). Next, a third PD sensing reference point 1303 is set (step S33) and the third reading reference value is calculated. If it cannot be calculated (step S34), control will proceed to step S29. If the third reading reference value has been calculated, the block data 104 will be read (step S35). If the process has not been completed (step S36), control will return to step S29.

A PDV is a unit vector to move the sensing point dot by dot for PD sensing. Because pattern dots 106 and data dots 102 are dots arranged in array on the same grid in the block structure as shown in FIG. 3, the reading reference vector calculated from the PD centroid train 139 is substantially the same as a PDV. Therefore, a PDV is first calculated from the positional relationship between the representative marker 120 and adjacent marker. Once the reading reference vector has been calculated, the vector can be used as a PDV. The change of the PDV can be dealt with by updating the reading reference vector each time the reading reference value is calculated. Specifically, after the reading reference vector has been calculated, it is stored in the PDV storage section 33 for subsequent use. This eliminates the necessity of calculating a PDV using an adjacent marker as shown in step S27 and later in the flowchart of FIG. 21. This is based on the fact learned by experience that the PDV will not change greatly in the same frame or between consecutive frames. This enables the block data 104 to be read reliably only when at least one marker 108 has been sensed in a representative marker search range 100 under relatively good imaging conditions. As a result, the block data is prevented from being partially lost due to the disappearance of a marker 108 or the occurrence of an erroneous marker 116. This avoids code reproduction failure and reduces the number of sensed markers to speed up the processing.

Even when the pattern dots 106 and data dots 102 have not been arranged in array on the same grid, a PDV can be determined easily by calculation from the reading reference vector, provided their correlation is determined by the format. The PDV storage section 33 stores the PDV calculated from the reading reference vector.

In the flowchart of FIG. 21, if there is any frame that has failed to sense the representative marker 120 or calculate the first reading reference value, a PDV will not be set in the frame. In this case, a PDV will be calculated again using the adjacent marker. As a result, the sensing of pattern dots 106 is prevented from being disabled because the stored PDV is referred to when scanning has missed the code and been done again.

As described above, the information reproducing system of the first embodiment senses the representative marker 120 correctly even when the disappearance of a marker 108 or the occurrence of an erroneous marker 116 has occurred. On the basis of the representative marker, the system senses pattern dots 106 and calculates data reading points 142, thereby preventing the block data 104 from being partially lost and reducing the marker sensing processes, which avoids code reproduction failure and achieves higher-speed processing.

[Second Embodiment]

Figure 22:
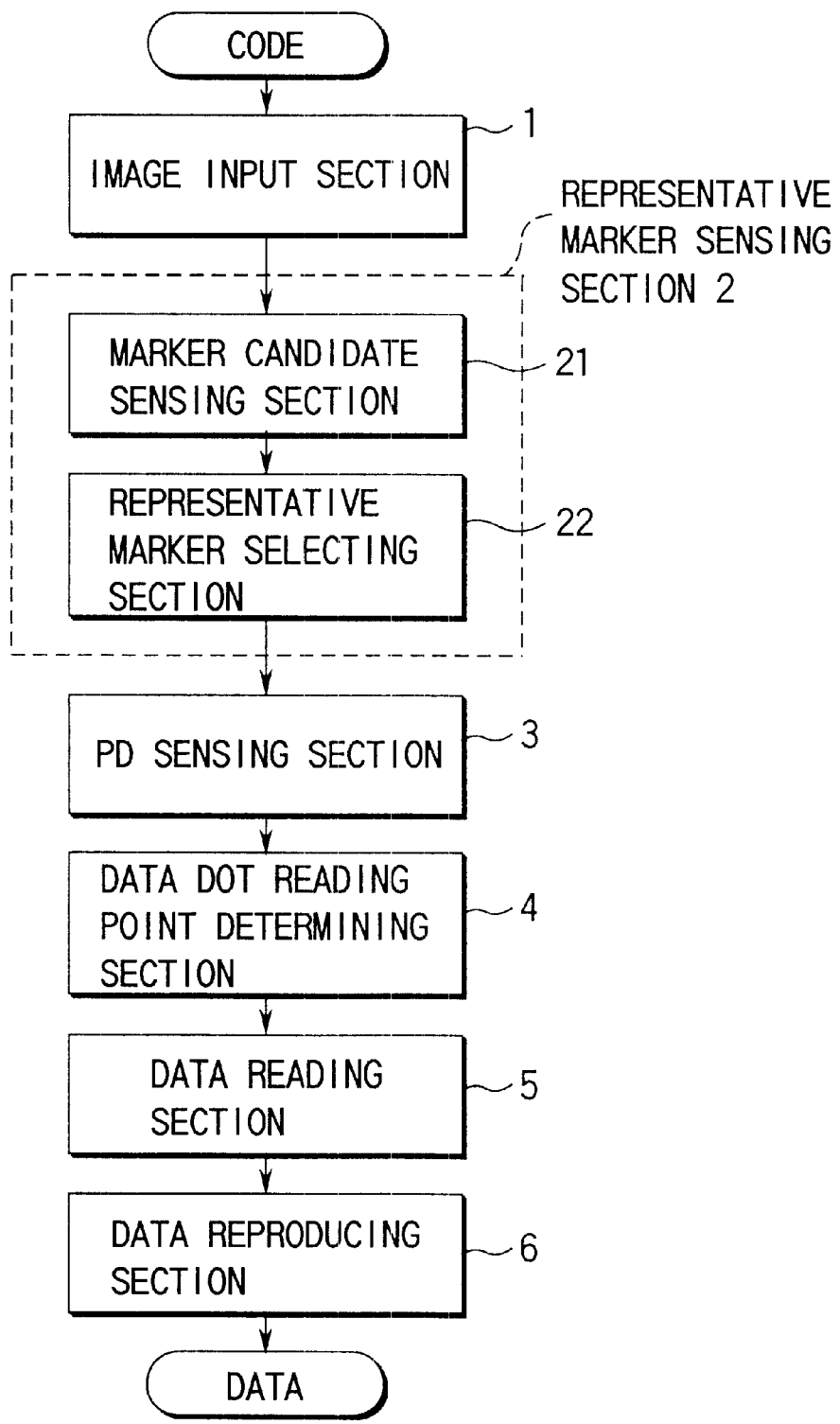
FIG. 22 is a block diagram of an information reproducing system according to a second embodiment of the present invention.

FIG. 22 shows the configuration of an information reproducing system according to a second embodiment of the present invention. As in the first embodiment, the information reproducing system of the second embodiment comprises an image input section 1, a representative marker sensing section 2, a PD sensing section 3, a data dot reading point determining section 4, a data reading section 5, and a data reproducing section 6. The information reproducing system of the second embodiment is the same as that of the first embodiment except for the representative marker sensing section 2. Therefore, explanation of the same parts will be omitted.

In the second embodiment, the representative marker sensing section 2 includes a marker candidate sensing section 21 and a representative marker selecting section 22.

Hereinafter, the operation of the representative marker sensing section 2 will be explained.

Figure 23:
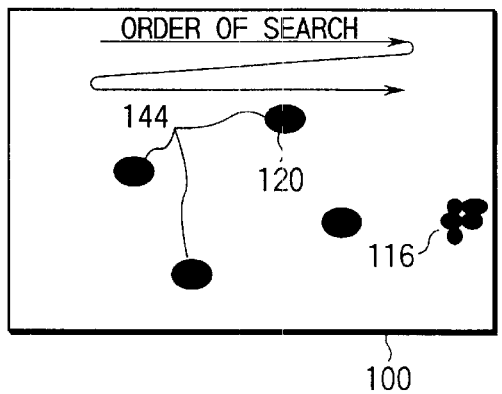
FIG. 23 is a diagram to help explain a method of selecting a representative marker in the second embodiment.

To simplify explanation, the marker candidate sensing section 21 searches a representative marker search range 100 for marker candidates 144 in order of search as shown in FIG. 23. Then, the representative marker selecting section 22 selects the first sensed marker candidate 144 as a representative marker 120 and outputs it to the PD sensing section 3. This makes the sensing process faster when no erroneous marker 116 has occurred.

Figure 24:
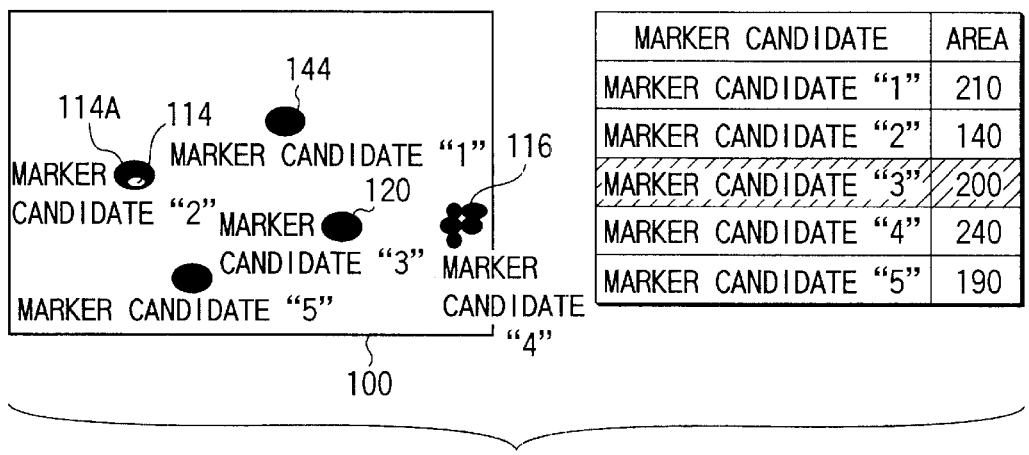
FIG. 24 is a diagram to help explain another method of selecting a representative marker in the second embodiment.

The marker candidate sensing section 21 may be designed to sense marker candidates 144 from the representative marker search range 100 on the basis of the amount of feature unique to a marker sensed easily but with insufficient accuracy. The representative marker selecting section 22 may then select the most marker-like one from the sensed marker candidates and output it as a representative marker 120 to the PD sensing section 3. For example, if the marker candidate sensing section 21 senses what includes a run of 4 dots or more of black pixels as a marker candidate 144, it will sense a defective marker 144A with a partial loss 144 or an erroneous marker 116 as a marker candidate 144 as shown in FIG. 24. However, the representative marker sensing section 22 selects as a representative marker 120 the one whose area is closest to the ideal area (for example, 200) of a marker 108 from the sensed marker candidates 144. As a result, the section 22 eventually selects marker candidate "3", the correct marker 108, as a representative marker 120. This enables the representative marker 120 to be sensed reliably by a relatively high-speed process even when a defective marker 114A or an erroneous marker 116 has occurred.

Figure 25:
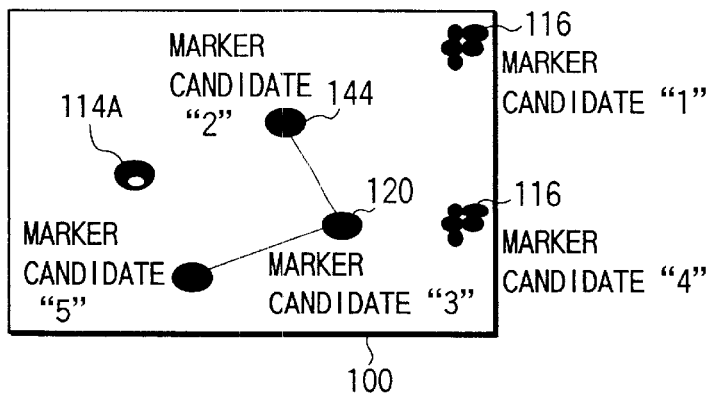
FIG. 25 is a diagram to help explain still another method of selecting a representative marker in the second embodiment.

Furthermore, the marker candidate sensing section 21 may be designed to sense marker candidates 144 from the representative marker search range 100 on the basis of the amount of feature unique to a marker sensed easily but with insufficient accuracy. The representative marker selecting section 22 may then find a group of candidates whose positional relationship agrees with the format from the sensed marker candidates and output one candidate in the group as a representative marker 120 to the PD sensing section 3. For example, if the marker candidate sensing section 21 senses what includes a run of 4 dots or more of black pixels as a marker candidate 144, it will sense some erroneous markers 116 as marker candidates 144 as shown in FIG. 25. However, the representative marker sensing section 22 selects the group that agrees with the format from the sensed marker candidates 144, thereby judging that the marker candidates "2", "3", and "5" constitute the correct marker group. From the group, the sensing section 22 selects, for example, marker candidate "3" as a representative marker 120, thereby selecting the correct marker 108. This enables the representative marker 120 to be sensed reliably even when an erroneous marker 116 with the amount of feature very close to the correct marker 108 has occurred.

As described above, in addition to the effect of the first embodiment, the second embodiment produces the effect of preventing not only the block data 104 from being partially lost as a result of erroneous sensing of the representative marker 120 but also the code from being reproduced inadequately even when an inappropriate image similar to the marker 108 has appeared in the representative marker search range 100 due to a defective recording medium or a poor imaging state.

[Third Embodiment]

Figure 26:
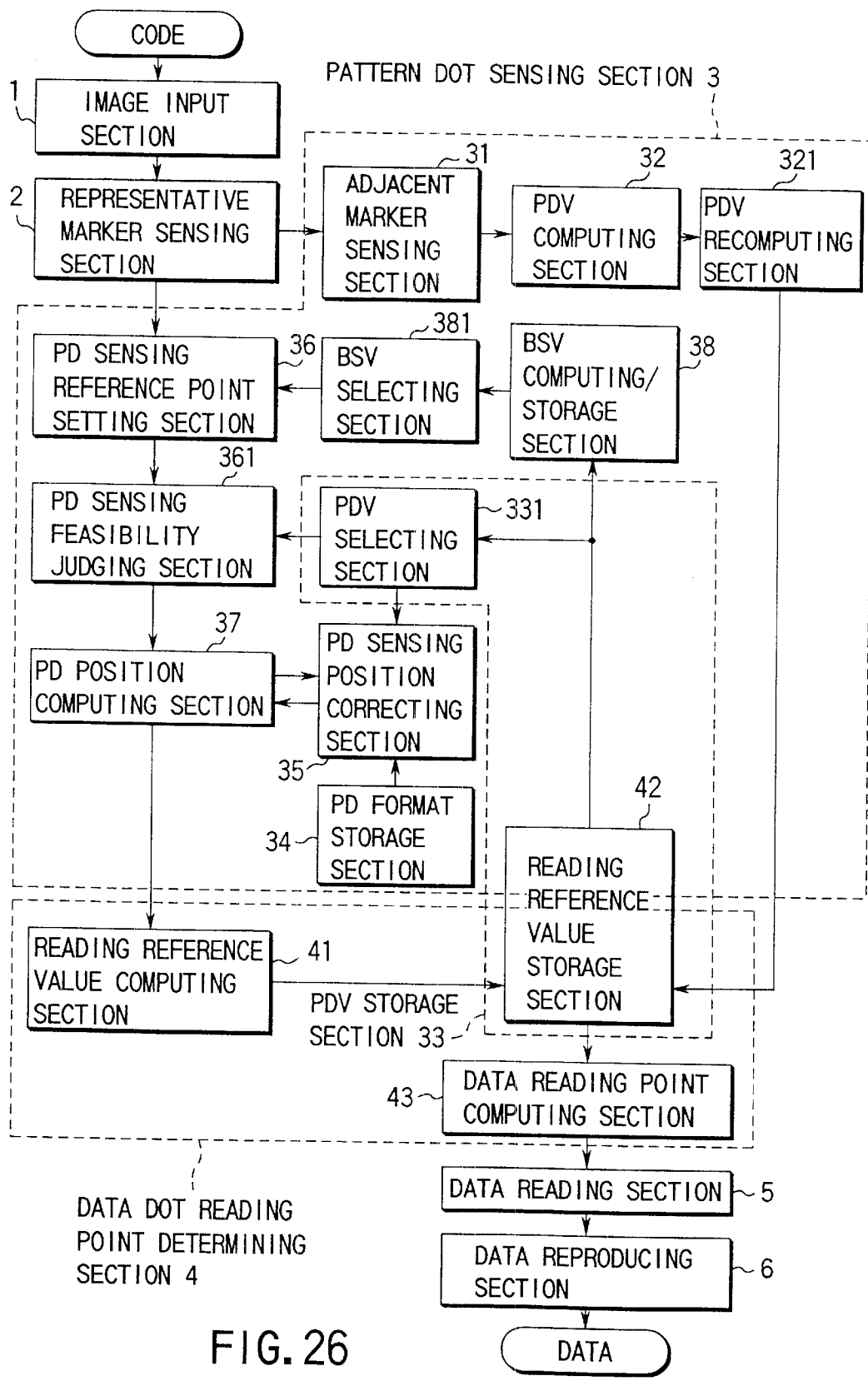
FIG. 26 is a block diagram of an information reproducing system according to a third embodiment of the present invention.

FIG. 26 shows the configuration of an information reproducing system according to a third embodiment of the present invention. As in the first embodiment, the information reproducing system of the third embodiment comprises an image input section 1, a representative marker sensing section 2, a PD sensing section 3, a data dot reading point determining section 4, a data reading section 5, and a data reproducing section 6. The information reproducing system of the third embodiment is the same as that of the first embodiment except that the configuration of the PD sensing section 3 and that of the data dot reading point determining section 4 differ from those of the first embodiment.

Specifically, the PD sensing section 3 includes an adjacent marker sensing section 31, a PDV computing section 32, a PDV storage section 33, a PD format storage section 34, a PD sensing position correcting section 35, a PD sensing reference point setting section 36, a PD position computing section 37, and a BSV computing/storage section 38. In the third embodiment, the PD sensing section 3 further includes a PDV recomputing section 321 behind the PDV computing section 32, a PD sensing feasibility judging section 361 behind the PD sensing reference point setting section 36, and a BSV selecting section 381 behind the BSV computing/ storage section 38. Furthermore, the PDV storage section 33 is composed of a reading reference value storage section 42 in the data dot reading point determining section 4 and a PDV selecting section 331. The data dot reading point determining section 4 includes a reading reference value computing section 41, a reading reference value storage section 42, and a data reading point computing section 43. The reading reference value storage section 42 shares memory with the PDV storage section 33 in the PD sensing section 3.

The operation of the information reproducing system of the third embodiment will be explained. The same parts as those of the first embodiment will be omitted.

In the third embodiment, it is assumed that a code in a format where a pair of direction indication dots 146 is placed with respect to a marker 108 is read as shown in FIG. 3. For example, one of the direction indication dots 146 is a black dot and the other is a white dot.

When pattern dots 106 are sensed on the basis of the PDV calculated from a marker pair, if the pattern dots 106 have not been sensed correctly and instead direction indication dots 146 have been sensed, the PDV recomputing section 321 will judge that the calculated PDV does not point to the pattern dots 106. Then, as shown in FIG. 27, the section 321 will rotate the PDV through 90°. As a result, the section 321 can calculate the PDV in the proper direction from the sensed marker pair even when the allowed skew angle has exceeded 45°.

The reading reference value computing section 41 calculates reading reference values for the present frame (for example, an n-th frame) as shown in FIG. 28A. The reading reference value storage section 42 stores them in a reading reference value table as shown in FIG. 28B. Then, the PDV selecting section 331 selects the corresponding PDV according to the position of each sensing reference point 130 as shown in FIG. 28C when pattern dots are sensed in the next frame (an (n+1)-th frame). The positions of the reading reference points 128 and the reading reference vectors may be stored in the reading reference value table in such a manner that they are related to each other and the reading reference vector corresponding to the reading reference point 128 closest to the position of the set sensing reference point 130 may be selected as a PDV.

Specifically, as in the first embodiment, the just calculated reading reference vector may be stored for subsequent PD sensing. When the distortion is great, the PDV changes, depending on its position in the frame. Therefore, the reading reference value storage section 42 stores reading reference vectors and their positions in such a manner that they are related to each other and selects a suitable reading reference vector as a PDV according to the PD sensing position. This enables pattern dots 106 to be sensed reliably and efficiently even when the distortion is great.

The BSV computing/storage section 38 calculates a BSV from two reading reference points $128_2$, $128_3$ facing each other with a block between them of the reading reference points 128 calculated in the present frame (for example, the n-th frame) as shown in FIG. 29A and stores the BSV in a BSV storage stable as shown in FIG. 29B. Then, as shown in FIG. 29C, the BSV selecting section 381 selects the BSVs corresponding to the positions of the sensing reference points $130_1$, $130_2$ to be set when the sensing reference point 130 in the next frame (the (n+1)-th frame) is set.

Specifically, as in the first embodiment, a BSV may be calculated from the calculated first reading reference vector and be used for sensing reference point setting. When the distortion is great, the BSV changes, depending on its position in the frame. Therefore, the BSV computing/storage section 38 stores BSVs and their positions in such a manner that they are related to each other and selects a suitable BSV according to the position of the sensing reference point to be set. This enables the optimal sensing reference point to be set even when the distortion is great.

Before sensing pattern dots 106, the PD sensing feasibility judging section 361 judges whether a point obtained by multiplying a PDV by n (n is the number of dots between markers) and adding the result to the PD sensing reference point is present on the imaging screen (or the frame 118). If it is present, the judging section 361 will judge that all of the pattern dots can be sensed and perform a PD sensing process. If it is not present on the screen, the judging section 361 will judge that any pattern dot cannot be sensed and end the PD sensing process or will sense only the imaged ones of the pattern dots 106. This prevents pattern dots 106 to be sensed from falling outside the screen in the course of sensing pattern dots, thereby eliminating useless PD sensing and making the processing efficient.

As described above, in addition to the effect of the first embodiment, the third embodiment produces the effect of preventing not only the block data 104 from being partially lost due to the disability for pattern dots 106 to be sensed but also the code from being reproduced inadequately, because a sensing reference point 128 is set suitably and pattern dots 106 are sensed reliably and efficiently even when the imaged code is distorted.

[Fourth Embodiment]

Figure 31:
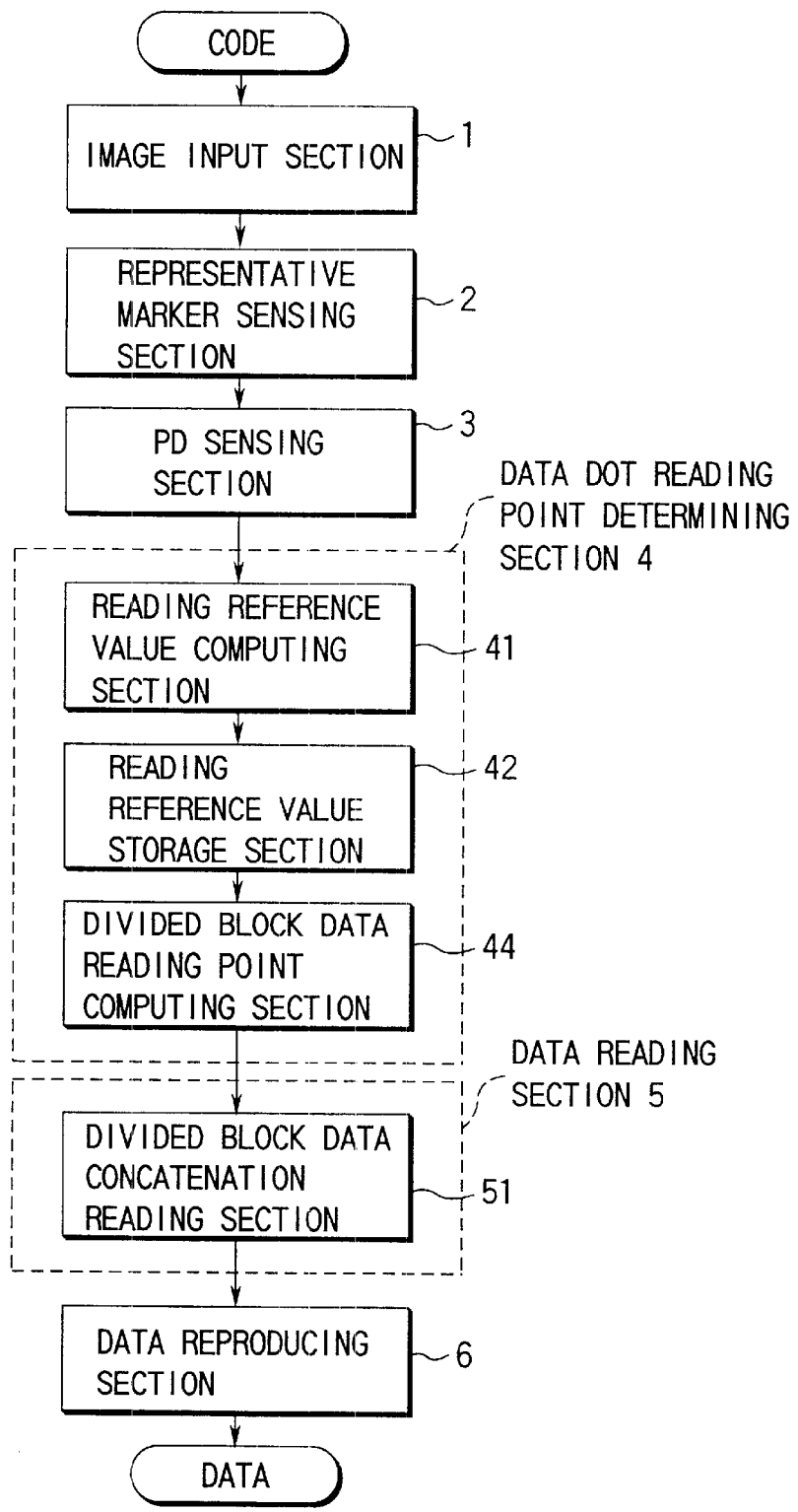
FIG. 31 is a block diagram of an information reproducing system according to a fourth embodiment of the present invention.

FIG. 31 shows the configuration of an information reproducing system according to a fourth embodiment of the present invention. As in the first embodiment, the information reproducing system of the fourth embodiment comprises an image input section 1, a representative marker sensing section 2, a PD sensing section 3, a data dot reading point determining section 4, a data reading section 5, and a data reproducing section 6. The information reproducing system of the fourth embodiment is the same as that of the first embodiment except for the data dot reading point determining section 4 and the data reading section 5. Therefore, explanation of the same parts will be omitted.

In the fourth embodiment, the data dot reading point determining section 4 includes a reading reference value computing section 41, a reading reference value storage section 42, and a divided block data reading point computing section 44. The data reading section 5 includes a divided block data concatenation reading section 51.

The divided block data reading point computing section 44 calculates a data reading point even for an imaged block part of which is missing. The divided block data concatenation reading section 51 reads the block data 104 at the calculated data reading point, concatenates to compensate for the missing data caused by a partial loss in a block with the same contents as those of another block, and outputs the resulting data.

For example, when a dot code where a block with the same contents has been recorded every other block as shown in FIG. 32A is imaged, block A and block B may be imaged as shown at the top of the FIG. 32B. In this case, although block A cannot be read as one block because part of block A is missing, the missing portion covering the end of the frame 118 can be read correctly as one block of data by concatenating the data items as shown at the bottom of FIG. 32B. In the fourth embodiment, the data items in the partially missing blocks are read and concatenated.

When the block address information has been stored in the block header 101 on the left side of the block as shown in FIG. 3, it cannot be read because the address for the divided block A at left is outside the frame. It is known, however, that blocks with the same address are arranged every other block as format information as shown in FIG. 32A. Therefore, it is understood that the blocks on both sides of block B are blocks A. These are concatenated and the resulting block is read correctly as block A.

Figure 33A:
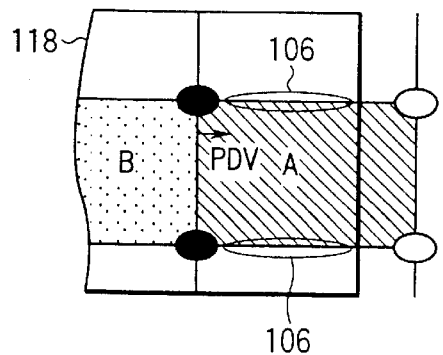
FIGS. 33A, 33B, and 33C are diagrams to help explain a method of calculating a reading reference value for divided blocks in the fourth embodiment.
Figure 33B:
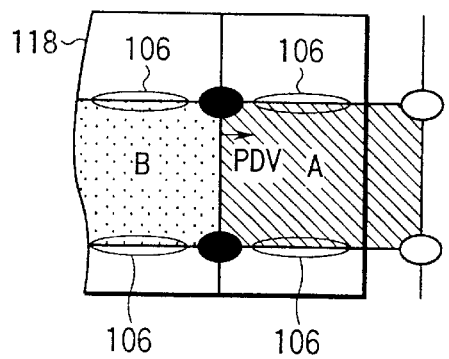
Figure 33C:
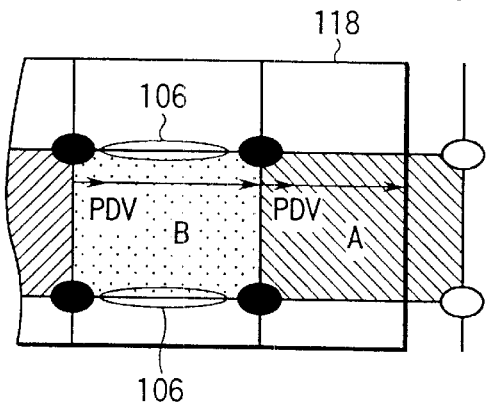

In the case of block A on the right side of the frame, pattern dots 106 in the imaged portion of the block may be used as the reading reference value of a partially missing block as shown in FIG. 33A. As the number of pattern dots 106 decreases, the accuracy decreases. Therefore, part of the pattern dots 106 in adjacent block B may be added as shown in FIG. 33B. When the distortion is not too large, the reading reference value for block B may be extrapolated as it is and applied to block A as shown in FIG. 33C. This eliminates the need for the PD sensing process or reading reference value computing process of the partially missing block A, which not only makes the processing faster but also gives consistency to the processes and simplifies the processing.

Figure 34:
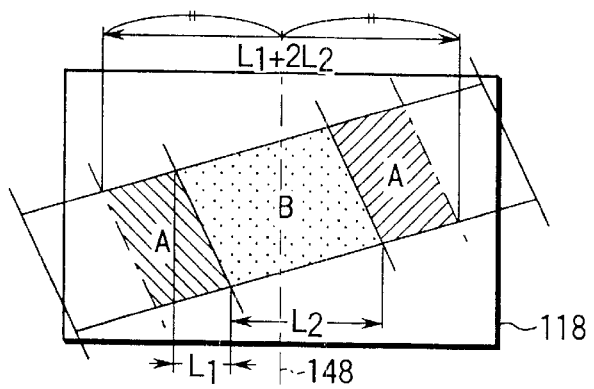
FIG. 34 is a diagram to help explain a dividing method in the fourth embodiment.

When all the data has been read to the frame end, the data items repeatedly read exist as shown by a crosshatched portion at the bottom of FIG. 32B. To avoid such data items and read only the necessary data items reliably, the divided block data reading point computing section 44 reads only the data items close to the central portion of the frame where imaging conditions are good. For example, as shown in FIG. 34, block A can be divided in parallel with the sides of a block. At this time, data items are selected so that the center of the reading block obtained by combining divided block A and divided block B may be on the center line 148 of the frame 118. At the same time, to prevent the necessary data times from being lost, division is made so that the width of a reading block may be $L_1+2L_2$, where two adjacent sides of the blocks are $L_1$ and $L_2$ as shown in the figure.

Figure 35:
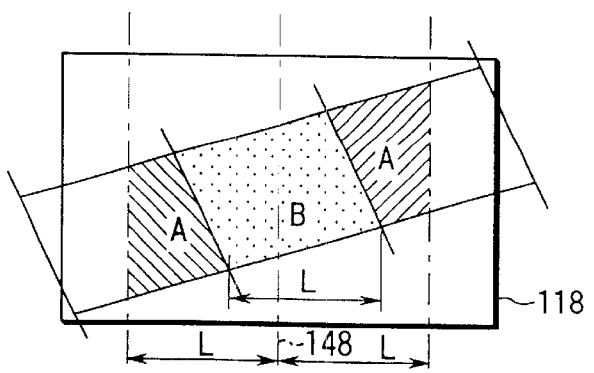
FIG. 35 is a diagram to help explain another dividing method in the fourth embodiment.

Furthermore, as shown in FIG. 35, block A may be divided in parallel with the frame end. At this time, a reading block obtained by combining a divided block A and a divided block B is divided into a right block and a left block with the center line 148 of the frame 118 running in the mid-point between them, each having a width of L. This enables data items close to the central portion of the frame to be read without any omissions reliably.

As described above, in addition to the effect of the first embodiment, the fourth embodiment produces the effect of preventing not only the block data 104 from being partially lost due to losses at the frame end but also the code from being reproduced inadequately because the block data 104 can be read even in a block part of which is missing at the frame end.

[Fifth Embodiment]

Figure 36:
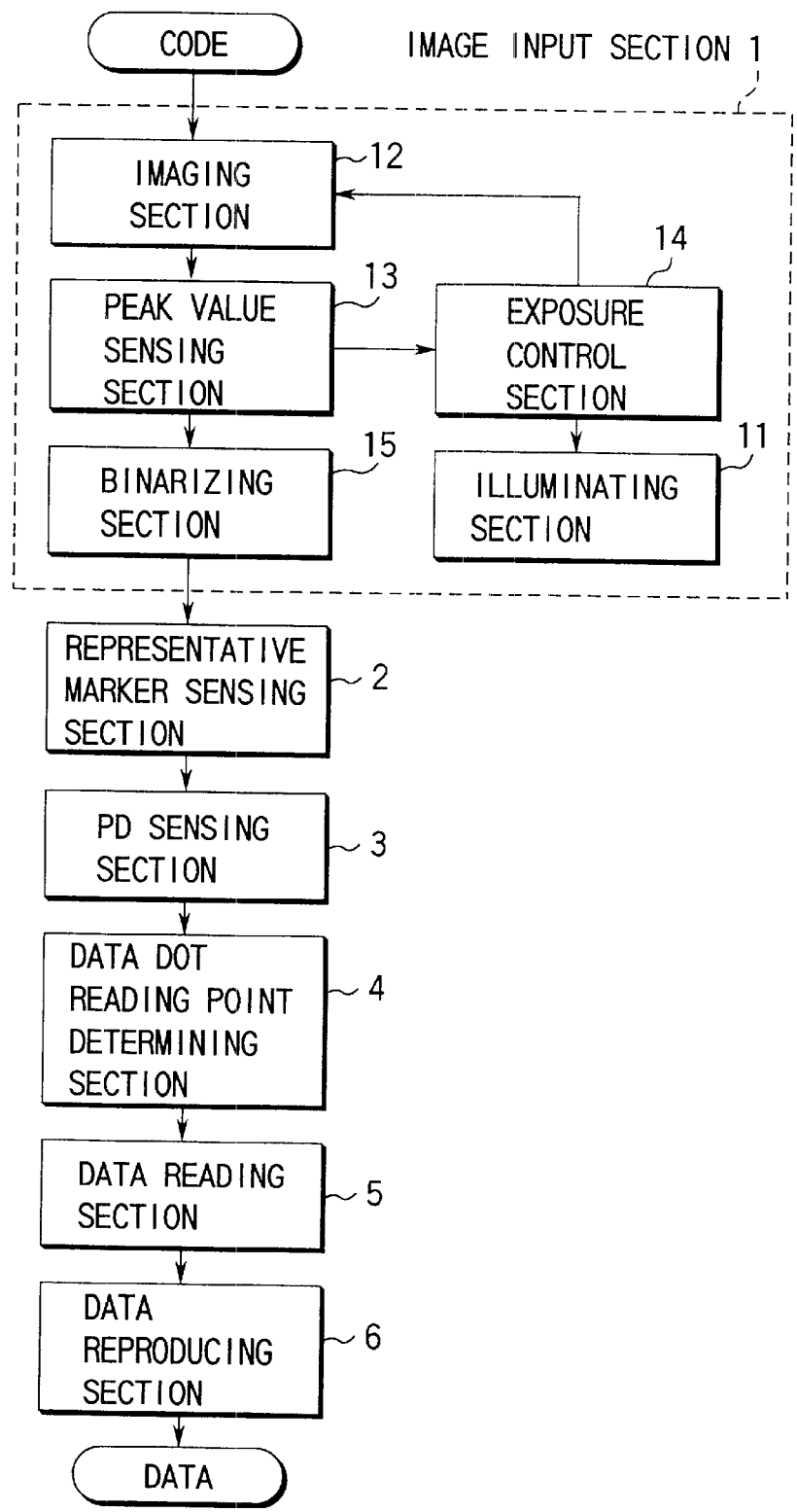
FIG. 36 is a block diagram of an information reproducing system according to a fifth embodiment of the present invention.

FIG. 36 shows the configuration of an information reproducing system according to a fifth embodiment of the present invention. As in the first embodiment, the information reproducing system of the fifth embodiment comprises an image input section 1, a representative marker sensing section 2, a PD sensing section 3, a data dot reading point determining section 4, a data reading section 5, and a data reproducing section 6. The information reproducing system of the fifth embodiment is the same as that of the first embodiment except for the image input section 1. Therefore, explanation of the same parts will be omitted.

In the fifth embodiment, the image input section 1 includes an illuminating section 11, an imaging section 12, a peak value sensing section 13, an exposure control section 14, and a binarizing section 15.

Figure 37A:
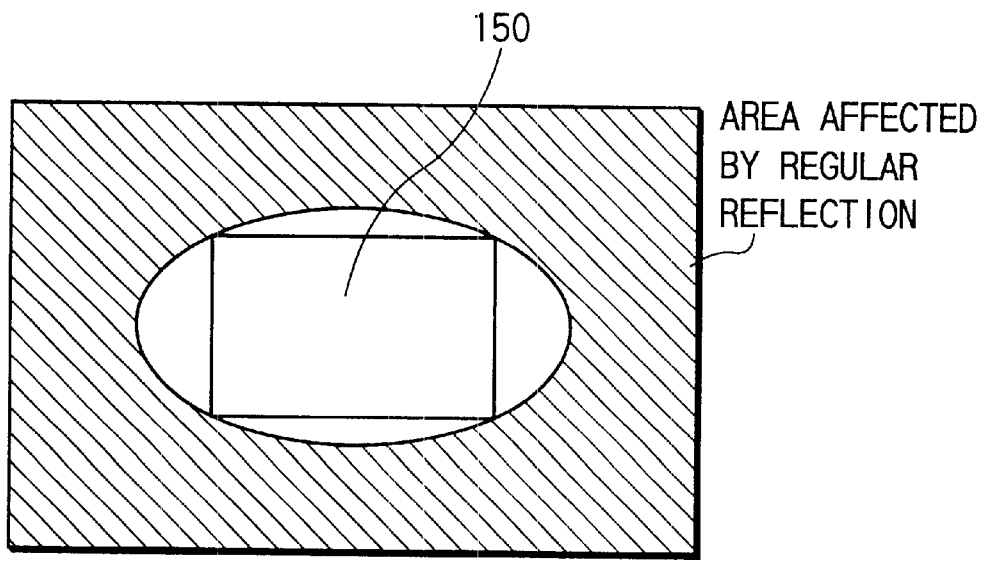
FIGS. 37A and 37B are diagrams to help explain a peak value sensing area in the fifth embodiment.
Figure 37B:
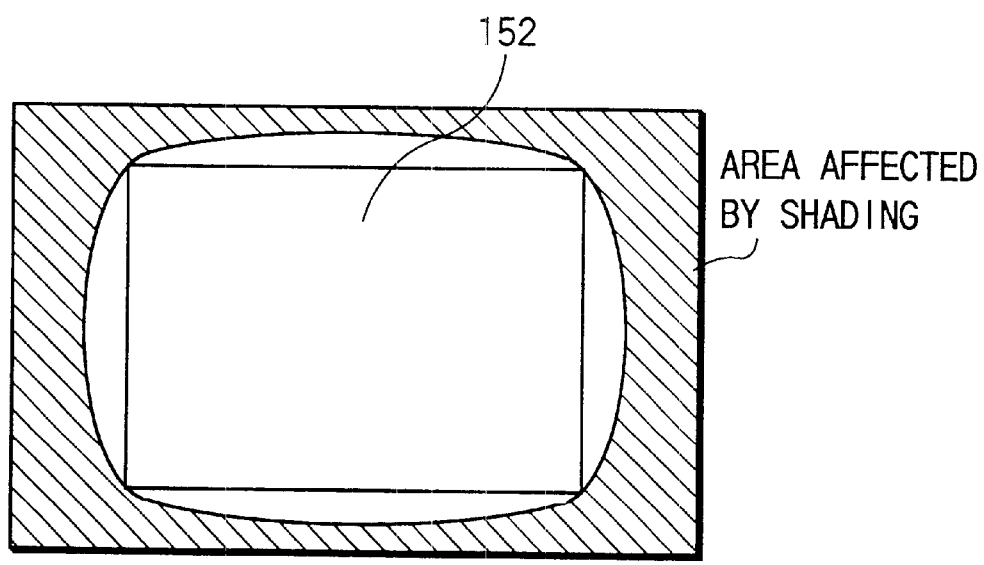

The imaging section 12 shoots a dot code illuminated by the illuminating section 11. The peak value sensing section 13 senses the maximum value of luminance from a first area in the imaging screen and the minimum value of luminance from a second area. As shown in FIG. 37A, for the maximum value not to be influenced by regular reflection, an area where an increase in the luminance due to regular reflection is smaller than a specific allowed value even for the allowed lifting or tilting of the imaging device is set as the first area (the maximum value sensing area) 150. Furthermore, as shown in FIG. 37B, for the minimum value not to be influenced by shading, an area where a decrease in the luminance is smaller than a specific allowed value even for the allowed lifting or tilting of the imaging device is set as the second area (the minimum value sensing area) 152. The exposure control section 14 controls the illuminating section 11 or imaging section 12 so that the proper exposure may be obtained on the basis of the maximum value of the sensed luminance.

For example, if the maximum value of luminance is $Y_M$, the present amount of illumination is L, the corrected amount of illumination is L', and the target value of lumi nance is $Y_t$, the illuminating section 11 will be controlled so as to meet the following equation:

$$L' = L \times Y_t / Y_M.$$

The binarizing section 15 calculates a threshold value from the maximum value and minimum value of the sensed luminance and binarizes the imaged code using the threshold value. For example, if the maximum value of luminance is $Y_M$ and the minimum value of luminance is $Y_m$, and the threshold value Th, the threshold value will be calculated as follows:

$$Th = k(Y_M - Y_m) + Y_m$$

where k is a constant determined by the recorded state of the code.

As described above, stable binarization can be effected by sensing the maximum value and minimum value of luminance from the areas unaffected by regular reflection or shading. This prevents a marker 108 from disappearing due to poor binarization or an erroneous marker 116 from occurring.

As described above, in addition to the effect of the first embodiment, the fifth embodiment produces the effect of preventing not only the block data 104 from being partially lost due to a failure to sense a marker but also the code from being reproduced inadequately because the disappearance of a marker 108 due to binarization failure or the occurrence of an erroneous marker 116 is prevented.

Although the embodiments of the invention have been disclosed and described, it is apparent that the invention is not limited to the embodiments and may be practiced or embodied in still other ways without departing from the spirit or essential characteristic thereof. The gist of the present invention is summarized as follows.

(1) An information reproducing system which optically reads a dot code from an information recording medium and reproduces information, the information recording medium on which an optically readable dot code has been recorded, the dot code composed of blocks arranged in array, each block including at least a data code made up of data dots arranged according to the contents of data related to information to be reproduced, a pattern code placed so as to have a specific positional relationship with the data dots and made up of pattern dots to determine reading points for the data dots, and markers to sense the pattern dots placed so as to have a specific positional relationship with the pattern dots and recorded in a manner different from the data dots and the pattern dots, the information reproducing system comprising:

image input means for shooting the dot code on the information recording medium;

representative marker sensing means for sensing one of the markers on the image shot by the image input means;

pattern dot sensing means for sensing the pattern dots on the basis of the position of the representative marker sensed by the representative marker sensing means;

data dot reading point determining means for determining a reading point for each data dot on the basis of the positions of the pattern dots sensed by the pattern dot sensing means;

data reading means for reading each data dot at the reading point determined by the data dot reading point determining means; and data reproducing means for concatenating the data items in each block read by the data reading means and reproducing the information.

This configuration corresponds to FIG. 1 in the first embodiment. The dot code is composed of blocks as shown in FIG. 3. A block includes a block header 101 carrying address information, block data 104 composed of data dots 102, pattern dots 106 to determine points for reading the block data 104, and markers 108. A block has a size that allows more than one block to fit in an imaging screen. Blocks are recorded in array according to a format.

The representative marker sensing section 2 corresponding to the representative marker sensing means senses one representative marker 120 on the screen shot by the image input section 1 corresponding to the image input means 1. The PD sensing section 3 corresponding to the pattern dot sensing means senses pattern dots 106 on the basis of the representative marker 120. The data dot reading point determining section 4 corresponding to the data dot reading point determining means determines reading points.

With this configuration, once one representative marker 120 has been sensed on the imaging screen, pattern dots 106 can be sensed on the basis of the representative marker 120 and data reading points 142 be calculated. This not only prevents an adverse effect of the disappearance of a marker 108 or the occurrence of an erroneous marker 116 and the partial loss of the block data 104 but also reduces the marker sensing process, avoids code reproduction failure, and speeds up the processing.

(2) The information reproducing system according to item (1), wherein the representative marker sensing means is designed to set in the central portion of the imaging screen an area where at least one of the markers constituting a block shot in a readable manner by the image input means can be sensed and sense the single marker in the set area.

This configuration corresponds to FIG. 1 in the first embodiment. Specifically, in the representative marker sensing section 2 corresponding to the representative marker sensing means, as shown in FIG. 2, the representative marker search range 100 is set in the central portion of the imaging screen so that it may not exist in a readable state outside the search range 100 even in the minimum block 110 where is to be shot and the entire search range may not be included in the block even when it is the maximum block 112. The sensing section 2 senses a representative marker 120 from the representative marker search range 100.

With this configuration, the necessary minimum area can be set as the representative marker search range 100, which not only prevents an adverse effect of the disappearance of a marker or the occurrence of an erroneous marker but also enables a representative marker 120 to be sensed reliably. Narrowing the range shortens the time required for sensing, making the processing faster.

(3) The information reproducing system according to item (1) or (2), wherein the representative marker sensing means is designed to set the first sensed marker candidate as a representative marker.

This configuration corresponds to FIG. 22 in the second embodiment. Specifically, the representative marker sensing section 2 corresponding to the representative marker sensing means is composed of a marker candidate sensing section 21 and a representative marker selecting section 22.

As shown in FIG. 23, the marker candidate sensing section 21 searches the representative marker search range 100 for marker candidates 144 in order of search. Then, the representative marker selecting section 22 selects the first sensed marker candidate 144 as a representative marker 120 and outputs it to the PD sensing section 3.

This configuration speeds up the sensing process.

(4) The information reproducing system according to item (1) or (2), wherein the representative marker sensing means is designed to sense marker candidates and set the marker candidate whose amount of feature is closest to a specific target value as a representative marker.

This configuration corresponds to FIG. 22 in the second embodiment. Specifically, the representative marker sensing section 2 corresponding to the representative marker sensing means is composed of a marker candidate sensing section 21 and a representative marker selecting section 22.

As shown in FIG. 24, the marker candidate sensing section 21 senses marker candidates 144 from the representative marker search range 100 on the basis of the amount of feature unique to a marker sensed easily but with insufficient accuracy. The representative marker selecting section 22 then selects the one whose amount of feature is closest to a specific target value from the sensed marker candidates and outputs it as a representative marker 120 to the PD sensing section 3.

With this configuration, even if a partially missing marker 114A or an erroneous marker 116 has been sensed as a marker candidate 144, the representative marker selecting section 22 selects the most marker-like one 108 from the sensed marker candidates 144 on the basis of its feature. This enables the representative marker 120 to be sensed reliably by a relatively high-speed process even when a partially missing marker 114A or an erroneous marker 116 has occurred.

(5) The information reproducing system according to item (1) or (2), wherein the representative marker sensing means is designed to sense marker candidates, select marker candidates whose positional relationship agrees with a predetermined format, and set one of the selected candidates as a representative marker.

This configuration corresponds to FIG. 22 in the second embodiment. Specifically, the representative marker sensing section 2 corresponding to the representative marker sensing means is composed of a marker candidate sensing section 21 and a representative marker selecting section 22.

As shown in FIG. 25, the marker candidate sensing section 21 senses marker candidates 144 from the representative marker search range 100 on the basis of the amount of feature unique to a marker sensed easily but with insufficient accuracy. The representative marker selecting section 22 then finds a group of candidates whose positional relationship agrees with the format from the sensed marker candidates and outputs one candidate in the group as a representative marker 120 to the PD sensing section 3.

With this configuration, not only the feature of a marker alone but also the feature of the positional relationship can be used. This enables the representative marker 120 to be sensed reliably even when an erroneous marker 116 with the amount of feature very close to the correct marker 108 has occurred.

(6) The information reproducing system according to item (1), wherein the pattern dot sensing means includes pattern dot sensing reference point setting means for, on the basis of the position of the representative marker sensed by the representative marker sensing means, setting a pattern dot sensing reference point serving as a reference position to sense the pattern dots, pattern dot format storage means for storing the positional relationship between each pattern dot in the pattern code and the pattern dot sensing reference point in the form of a pattern dot format, and pattern dot reading vector storage means for storing a pattern dot reading vector to determine sensing points for the pattern dots on the basis of the pattern dot sensing reference point, and is designed to move the sensing point for the each pattern dot according to the pattern dot reading vector, starting from the pattern dot sensing reference point on the basis of the stored pattern dot format.

This configuration corresponds to FIG. 1 in the first embodiment. Specifically, on the basis of the point set by the PD sensing reference point setting section 36 corresponding to the pattern dot sensing reference point setting means, the PD sensing section 3 corresponding to the pattern dot sensing means senses pattern dots 106 according to the PDV stored in the PDV storage section 33 corresponding to the pattern dot reading vector storage means, starting from the PD sensing reference point 130 as shown in FIGS. 11, 12, 13, and 14.

With this configuration, setting one PD sensing reference point 130 enables each pattern dot 106 in a pattern code including the sensing reference point 130 to be sensed reliably.

(7) The information reproducing system according to item (6), wherein the pattern dot sensing means includes pattern dot sensing feasibility judging means for, before pattern dot sensing, judging whether a point obtained by extending the pattern dot reading vector by one block from the pattern dot sensing reference point exists in the screen shot by the image input means.

This configuration corresponds to FIG. 26 in the third embodiment. Before PD sensing, the PD sensing feasibility judging section 361 corresponding to the pattern dot sensing feasibility judging means confirms whether a point obtained by multiplying a PDV by n (n is the number of dots between markers) and adding the result to the PD sensing reference point 130 exists in the imaging screen as shown in FIG. 30. If it exists in the imaging screen, the judging section 361 will judge that all the pattern dots can be sensed and perform a PD sensing process. If it does not exist in the imaging screen, the judging section 361 will judge that the pattern dots cannot be sensed and end the PD sensing process or sense only the imaged ones of the pattern dots 106.

This configuration prevents pattern dots 106 to be sensed from falling outside the screen in the course of sensing pattern dots, eliminates useless PD sensing, and makes the processing more efficient.

(8) The information reproducing system according to item (6), wherein the pattern dot sensing means includes adjacent marker sensing means for sensing a marker adjacent to the representative marker on the basis of the position of the representative marker sensed by the representative marker sensing means, and pattern dot reading vector computing means for applying a marker pair made up of the representative marker and the adjacent marker to one of the marker pairs constituting the block and calculating a pattern dot reading vector from their positional relationship.

This configuration corresponds to FIG. 1 in the first embodiment. Specifically, as shown in FIG. 5, the adjacent marker sensing section 31 corresponding to adjacent marker sensing means calculates adjacent marker search ranges 122 from the inter-marker distance L determined by the format, allowed skew angle $\theta$, and the position of the representative marker 120 and senses an adjacent marker in the search ranges 122. The PDV computing section 32 corresponding to the pattern dot reading vector computing means divides the space between the sensed representative marker 120 and a representative point for the adjacent markers (for example, a near center such as the centroid) into n equal parts and calculates a PDV, where n is the number of dots between markers. The PDV storage section 33 corresponding to the pattern dot reading vector storage means stores the PDV.

With this configuration, a PDV is set in the PDV storage section 33 on the basis of the position of the adjacent marker, which enables pattern dots 106 to be sensed reliably in starting to shoot a code.

(9) The information reproducing system according to item (8), wherein the adjacent marker sensing means is designed to sense an adjacent marker in at least one adjacent marker sensing area determined by the size and position of the representative marker sensed by the representative marker sensing means and a predetermined allowed skew angle.

This configuration corresponds to FIG. 1 in the first embodiment. Specifically, the adjacent marker sensing section 31 corresponding to the adjacent marker sensing means estimates an inter-marker distance L from the size of the representative marker 120 sensed by the representative marker sensing section 2 corresponding to the representative marker sensing means, determines adjacent marker search ranges 122 from the inter-marker distance L, allowed skew angle θ, and the position of the representative marker 120 and senses a marker 108 in the search ranges 122.

With this configuration, searching an adjacent marker in the necessary minimum area prevents an adverse effect of the disappearance of markers or the occurrence of erroneous markers, which makes it possible to sense an adjacent marker reliably. Moreover, narrowing the area shortens the time required for sensing, helping increase the processing speed.

(10) The information reproducing system according to item (8), wherein the pattern dot reading vector computing means further includes pattern dot reading vector recomputing means for, when pattern dots cannot be sensed on the basis of the calculated pattern dot reading vector, applying a marker pair made up of the representative marker and the adjacent marker again to another marker pair constituting the block and recomputing the pattern dot reading vector.

This configuration corresponds to FIG. 26 in the third embodiment. Specifically, if being unable to sense pattern dots 106 properly when pattern dots 106 are sensed on the basis of the PDV calculated from a marker pair made up of the representative marker 120 and adjacent marker as shown in FIG. 27, the PDV recomputing section 321 corresponding to the pattern dot reading vector recomputing means will judge that the calculated PDV does not point in the direction of the pattern dots 106. Then, the computing section 321 applies the sensed marker pair to another marker pair constituting the block, and recomputes the PDV. For example, in a block as shown in FIG. 3, if direction indication dots 146 have been sensed instead of the pattern dots 106, the computing section 321 will rotate the PDV through 90°.

This configuration enables a PDV in the correct direction to be calculated from the sensed marker pair even when the allowed skew angle has exceeded 45°.

(11) The information reproducing system according to item (6), wherein the pattern dot sensing means further includes pattern dot sensing position correcting ing means for correcting the pattern dot sensing position each time a pattern dot is sensed, in order to sense a pattern dot reliably.

This configuration corresponds to FIG. 1 in the first embodiment. Specifically, as shown in FIGS. 11, 12, 13, and 14, the PD sensing section 3 corresponding to the pattern dot sensing means moves the sensing point from the PD sensing reference point 130 to the position in which a pattern dot 106 exists according to a PDV, applies a mask 132 having an area about four times as large as a dot with the new sensing point as the center, and calculates the centroid of the pattern dot 106 sensed in the mask. At this time, as shown in FIG. 14, the PD sensing position correcting section 35 corresponding to the pattern dot sensing position correcting means refers to the format stored in the PD format storage section 34 corresponding to the pattern dot format storage means. If the sensed pattern dot 106 agrees with the format, the correcting section 35 will update the PD sensing position correcting vector 136 so that the PD sensing point may move to the determined position of the centroid. This operation is repeated each time a pattern dot 106 has been sensed.

With this configuration, the PD sensing position is corrected each time a pattern dot 106 is sensed. Even when the accuracy of the PD sensing reference point 130 or that of the PDV is not too high, pattern dots 106 can be sensed reliably and the centroid of each pattern dot 106 be determined properly.

(12) The information reproducing system according to item (11), wherein the pattern dot sensing means further includes means for, when a first pattern dot is sensed, calculating its centroid, correcting the pattern dot sensing position on the basis of the position of the centroid of the calculated pattern dot, and sensing a pattern dot again.

This configuration corresponds to FIG. 1 in the first embodiment. Specifically, the PD sensing position correcting section 35 corresponding to the pattern dot sensing position correcting means moves the sensing point from the PD sensing reference point 130 to the position in which a pattern dot 106 exists according to a PDV as shown in FIG. 12, referring to the format stored in the PD format storage section 34 corresponding to the pattern dot format storage means, applies a mask 132 having an area about four times as large as a dot with the new sensing point as the center, calculates the centroid of the pattern dot 106 sensed in the mask, and moves the PD sensing point to the position 134 of the centroid. Then, as shown in FIG. 13, the correcting section 35 adds the movement as a PD sensing position correcting vector 136 to the PD sensing reference point 130 and senses pattern dots 106, starting from the first one.

With this configuration, a pattern dot 106 is sensed again after the PD sensing position has been corrected on the basis of the first sensed pattern dot 106. This enables a pattern dot 106 to be sensed reliably and the centroid of the first sensed pattern dot 106 to be determined correctly even when the accuracy of the PD sensing reference point 130 or that of the PDV is not so high and part of the pattern dot 106 sticks out of the mask 132.

(13) The information reproducing system according to item (6), wherein the pattern dot sensing means is designed to sense pattern dots included in pattern codes sharing the pattern dot sensing reference point set by the pattern dot sensing reference point setting means.

This configuration corresponds to FIG. 1 in the first embodiment. Specifically, as shown in FIG. 15A, the PD sensing section 3 corresponding to the pattern dot sensing means sequentially senses the pattern dots 106 in two pattern codes sharing the PD sensing reference point 130 by use of the PDV and of the vector obtained by reversing the PDV from the PD sensing reference point 130 set by the PD sensing reference point setting section 36 corresponding to the pattern dot sensing reference point setting means.

With this configuration, one setting of the PD sensing reference point 130 enables two reading reference points and two reading reference vectors to be calculated, which improves efficiency in calculation. When the distortion is small, those reference points and vectors may be averaged (in the case of reading reference vectors, the sign of one reference vector is reversed and then the vectors are averaged) as shown in FIG. 15B, thereby improving the storage efficiency of PDV in the reading reference value storage section 42 and PDV storage section 33 corresponding to the pattern dot reading vector storage means.

(14) The information reproducing system according to item (1), wherein the data dot reading point determining means includes reading reference value computing means for calculating a reading reference point by a method of least squares and a reading reference vector in data dots on the basis of the positions of the pattern dots sensed by the pattern dot sensing means, and reading point computing means for calculating reading points for the data dots on the basis of the reading reference point and reading reference vector calculated by the reading reference value computing means.

The configuration corresponds to FIG. 1 in the first embodiment. Specifically, the reading reference value computing section 41 corresponding to the reading reference value computing means calculates a reading reference point and a reading reference vector by a method of least squares on the basis of the positions of the pattern dots 106 sensed by the PD sensing section 3 corresponding to the pattern dot sensing means. The data reading point computing section 43 corresponding to the reading point computing means calculates reading points for the data dots 102 on the basis of the reading reference point and reading reference vector calculated by the reading reference value computing section 41.

With this configuration, a reading reference value is determined with high accuracy for each pattern code and each dot in the data code is sensed easily and reliably.

(15) The information reproducing system according to item (14), wherein the reading point computing means is designed to calculate reading points for block data using reading reference points and reading reference vectors.

This configuration corresponds to FIG. 1 in the first embodiment.

In the block structure as shown in FIG. 3, the data reading point computing section 43 corresponding to the reading point computing means calculates reading points 142 for data dots 102 by dividing the space between the corresponding reading reference points into n equal parts (n is the number of dots between markers) on the basis of the reading reference points $128_1$, $128_2$ and reading reference vectors $140_1$, $140_2$ in two pattern codes facing each other with a block between them as shown in FIG. 18.

This configuration enables a reading reference value to be calculated locally near a block to be read. As a result, each dot in the data code can be sensed easily and reliably even when the image has been distorted greatly due to the lifting or tilting of the imaging device.

(16) The information reproducing system according to item (14), wherein the pattern dot sensing means includes pattern dot sensing reference point setting means for setting a pattern dot sensing reference point serving as a reference position to sense the pattern dots on the basis of the position of the representative marker sensed by the representative marker sensing means, pattern dot format storage means for storing the positional relationship between each pattern dot in the pattern code and the pattern dot sensing reference point in the form of a pattern dot format, and pattern dot reading vector storage means for storing a pattern dot reading vector to determine a sensing point for the pattern dots on the basis of the pattern dot sensing reference point, and is designed to sense the pattern dots by moving the sensing point for the pattern dot according to the pattern dot reading vector, starting from the pattern dot sensing reference point, on the basis of the stored pattern dot format, and the pattern dot reading vector storage means is designed to calculate a pattern dot reading vector according to the reading reference vector calculated by the reading reference value computing means and store the resulting vector.

This configuration corresponds to FIG. 1 in the first embodiment. Specifically, the PDV storage section 33 corresponding to the pattern dot reading vector storage means first stores the PDV calculated on the basis of the positional relationship between the representative marker 120 and the adjacent marker. As shown in FIG. 21, once a reading reference vector has been calculated, a PDV is calculated using the calculated reading reference vector and stored. To sense a subsequent PD 106, the stored PDV is used without calculating a new PDV. When pattern dots 106 and data dots 102 are arranged in array on the same grid as shown in FIG. 3, a reading reference vector is substantially the same as a PDV. Therefore, the PDV storage section 33 simply stores a reading reference vector as a PDV. The PDV is updated each time a reading reference vector is calculated.

With this configuration, after the reading reference vector has been calculated, the process of calculating a PDV using an adjacent marker is not needed. This enables the block data 104 to be read reliably only when at least one representative marker 120 has been sensed. As a result, the block data 104 is prevented from being lost due to the disappearance of a marker 108 or the occurrence of an erroneous marker 116. This prevents the code from being reproduced inadequately and decreases the number of sensed markers, which makes the processing faster.

(17) The information reproducing system according to item (16), wherein the pattern dot reading vector storage means is designed to relate the reading reference vectors calculated by the reading reference value computing means to the corresponding reading reference points, store them as pattern dot reading vectors, and selectively apply the stored pattern dot reading vectors in the next imaging screen on the basis of the positional relationship between the pattern dot sensing reference point and the stored reading reference point.

This configuration corresponds to FIG. 26 in the third embodiment. Specifically, the PDV storage section 33 corresponding to the pattern dot reading vector storage means corresponds to the reading reference value storage section 42 and further includes the PDV selecting section 331.

The reading reference value storage section 42 relates the reading reference vectors in the imaging screen calculated as shown in FIG. 28A by the reading reference value computing section 41 corresponding to the reading reference value computing means to the corresponding reading reference points and stores them in a reading reference value storage table as shown in FIG. 28B. In sensing pattern dots in the next imaging screen, the PDV selecting section 331 selects the corresponding reading reference vector according to the position of the sensing reference point as shown in FIG. 28C.

With this configuration, a suitable PDV can be selectively applied according to the PD sensing position. This enables pattern dots 106 to be sensed reliably and efficiently even when the distortion is great.

(18) The information reproducing system according to item (1), wherein the pattern dot sensing means includes pattern dot sensing reference point setting means for setting a pattern dot sensing reference point serving as a reference position to sense the pattern dots on the basis of the position of the representative marker sensed by the representative marker sensing means, pattern dot format storage means for storing the positional relationship between each pattern dot in the pattern code and the pattern dot sensing reference point in the form of a pattern dot format, and pattern dot reading vector storage means for storing a pattern dot reading vector to determine sensing points for the pattern dots on the basis of the pattern dot sensing reference point, and is designed to sense the pattern dots by moving the sensing point for the pattern dot according to the pattern dot reading vector, starting from the pattern dot sensing reference point, on the basis of the stored pattern dot format, the data dot reading point determining means includes reading reference value computing means for calculating a reading reference point and a reading reference vector from the positions of the pattern dots sensed by the pattern dot sensing means, the pattern dot sensing means further includes block skip vector computing/storage means for calculating a block skip vector on the basis of the reading reference vector calculated by the reading reference value computing means and storing the block skip vector, and the pattern dot sensing reference point setting means is designed to set the next pattern dot sensing reference point on the basis of the reading reference point calculated by the reading reference value computing means and the block skip vector computed and stored by the block skip vector computing/storage means.

This configuration corresponds to FIG. 1 in the first embodiment. When a block is structured as shown in FIG. 3, the BSV computing/storage section 38 corresponding to the block skip vector computing/storage means rotates the calculated PDV to the other side of the block (through 90° in the figure) as shown in FIG. 9 and multiplies it by m (m is the number of dots between sensing reference points) to calculate a BSV, and stores the BSV. Then, the PD sensing reference point setting section 36 corresponding to the pattern dot sensing reference point setting means sets a second PD sensing reference point $130_2$ according to a first reading reference value and the stored BSV as shown in FIG. 8A, senses pattern dots on the basis of the sensing reference point, and calculates a reading reference value (a second reading reference value) for pattern codes facing each other with a block between them from the obtained PD centroid train 139.

With this configuration, a BSV is determined on the basis of the calculated reading reference value and a new PD sensing reference point is set. This eliminates the necessity of sensing a new marker 108 to determine a reading reference value for pattern codes facing each other with a block between them. Consequently, an adverse effect of the disappearance of markers or the occurrence of erroneous markers is prevented and a reading reference value is determined reliably. The decreased number of sensed markers reduces the time required to sense makers, helping make the processing faster.

(19) The information reproducing system according to item (18), wherein the block skip vector computing/ storage means is designed to relate the calculated block skip vectors on the present imaging screen to the corresponding reading reference points and store them and selectively apply the stored block skip vectors on the next imaging screen on the basis of the positional relationship between reading reference points and the stored reading reference points.

This configuration corresponds to FIG. 26 in the third embodiment. Specifically, the BSV computing/storage section 38 corresponding to the block skip vector computing/storage means includes a BSV selecting section 381.

As shown in FIG. 29A, the BSV computing/storage section 38 calculates a BSV from two reading reference points facing each other with a block between them of the reading reference points calculated on the imaging screen. Then, the section 38 relates the BSV to the corresponding reading reference point as shown in FIG. 29B and stores them in a BSV storage table. The BSV selecting section 381, as shown in FIG. 29C, selects a BSV corresponding to the position of the sensing reference point to be set and applies it in setting the sensing reference point on the next imaging screen.

With this configuration, a suitable BSV is selectively applied to set a sensing reference point according to the position of the sensing reference point to be set. This enables the optimum sensing reference point to be set even when the distortion is great.

(20) The information reproducing system according to item (1), wherein the dot code has blocks with the same contents placed at regular intervals of several blocks and recorded in such a manner that part of them may overlap with each other on a single imaging screen by the image input means, the data dot reading point determining means includes reading reference value computing means for calculating a reading reference point and a reading reference vector from the positions of the pattern dots sensed by the pattern dot sensing means, and divided block data reading point computing means for calculating the data dot reading points for blocks with the same contents part of which are missing because they partially cover the end of the imaging screen, from the reading reference point and reading reference vector calculated by the reading reference value computing means, and the data reading means includes divided block data concatenation reading means for reading data dots on the basis of the reading points calculated by the divided block data reading point computing means and concatenating the divided block data items into a single block data item.

This configuration corresponds to FIG. 31 in the fourth embodiment. Specifically, the divided block data reading point computing section 44 corresponding to the divided block data reading point computing means calculates data reading points even for blocks with the same contents part of which are missing as shown at the top of FIG. 32B. The divided block data concatenation reading section 51 corresponding to the divided block data concatenation reading means reads the block data at the calculated data reading points as shown at the bottom of FIG. 32B and concatenates and outputs the data items in the blocks with the same contents. At this time, to prevent the crosshatched portion from being read repeatedly, the block data 104 is divided so as not to leave any overlap and then is read as shown in FIGS. 34 and 35.

With this configuration, even when part of a block is missing at the end of the imaging screen, one block of data can be read correctly by dividing and reading the data items in a block with the same contents as those of the partially missing block and concatenating the divided items into a single block. This prevents the block data 104 from being partially lost due to the partial missing of the block at the end of the imaging screen and avoids code reproduction failure.

(21) The information reproducing system according to item (20), wherein the data dot reading point determining means is designed to calculate a reading reference point and a reading reference vector from the block and the positions of pattern dots near the block to calculate reading points for the block data part of which is missing because the block partially covers the end of the imaging screen.

This configuration corresponds to FIG. 31 in the fourth embodiment. Specifically, for a block part of which is missing because it overlaps with the end of the imaging screen, the reading reference value computing section 41 calculates a reading reference point and a reading reference vector from the pattern dots 106 in the block as shown in FIG. 33A or from the positions of the pattern dots 106 near the block as shown in FIG. 33B.

With this configuration, even in the case of a block part of which is missing at the end of the imaging screen, data dot reading points can be calculated with high accuracy, which makes it possible to sense each dot in the data code easily and reliably.

(22) The information reproducing system according to item (20), wherein the divided block data reading point computing means is designed to extrapolate a reading reference point and reading reference vector calculated from a pattern code imaged without any loss to calculate reading points for the block data part of which is missing because the block partially covers the end of the imaging screen.

The configuration corresponds to FIG. 31 in the fourth embodiment. Specifically, as shown in FIG. 33C, when calculating data reading points for the block A part of which is missing, the divided block data reading point computing section 44 corresponding to the divided block data reading point computing means extrapolates the reading reference value determined from pattern dots 106 in the block B imaged without any loss.

With this configuration, neither the process of sensing pattern dots in a partially missing block nor the process of calculating a reading reference value is needed. This not only makes the processing faster but also gives consistency to the processing and simplifies the processing.

(23) The information reproducing system according to item (1), wherein
the image input means includes
illumination means for illuminating dot codes to be imaged,
imaging means for shooting dot codes,
peak value sensing means for sensing the maximum value and minimum value of luminance from the screen shot by the imaging means,
exposure control means for controlling the amount of illumination by the illumination means or the amount of exposure, such as the exposure time, by the imaging means so that the maximum value of luminance sensed by the peak value sensing means may lie in a specific range, and
binarizing means for binarizing the screen shot by the imaging means according to a threshold value determined on the basis of the maximum value and minimum value of luminance sensed by the peak value sensing means, and
the peak value sensing means is designed to sense the maximum value from an area where an increase in the luminance due to regular reflection is smaller than a specific allowed value even for an allowed lifting or tilting of the imaging device.

This configuration corresponds to FIG. 36 in the fifth embodiment. Specifically, the illumination section 11 corresponding to the illumination means illuminates a code to be imaged. The peak value sensing section 13 corresponding to the peak value sensing means senses the maximum value of illumination from a first area and the minimum value of illumination from a second area on the imaging screen. An area 150 where an increase in the luminance due to regular reflection is smaller than the allowed value even for the allowed lifting or tilting of the imaging device is set as the first area as shown in FIG. 37A in order to prevent the maximum value from being affected by regular reflection. Then, the exposure control section 14 corresponding to the exposure control means controls the illumination section 11 or the imaging section 12 so that the amount of exposure may be optimal on the basis of the sensed maximum value of luminance. The binarizing section 15 corresponding to the binarizing means calculates a threshold value from the sensed maximum and minimum values of luminance and binarizes the imaged code using the threshold value.

With this configuration, the maximum value is prevented from being affected by regular reflection. This prevents the amount of exposure from being controlled inadequately and enables stable binarization. Therefore, it is possible to prevent the disappearance of markers 108 or the occurrence 116 of erroneous markers 116 due to binarization failure.

(24) The information reproducing system according to item (1), wherein
the image input means includes
illumination means for illuminating dot codes to be imaged,
imaging means for shooting dot codes,
peak value sensing means for sensing the maximum value and minimum value of luminance from the screen shot by the imaging means,
exposure control means for controlling the amount of illumination by the illumination means or the amount of exposure, such as the exposure time, by the imaging means so that the maximum value of luminance sensed by the peak value sensing means may lie in a specific range, and
binarizing means for binarizing the screen shot by the imaging means according to a threshold value determined on the basis of the maximum value and minimum value of luminance sensed by the peak value sensing means, and
the peak value sensing means is designed to sense the minimum value from an area where a decrease in the luminance due to shading is smaller than a specific allowed value even for an allowed lifting or tilting of the imaging device.

This configuration corresponds to FIG. 36 in the fifth embodiment. Specifically, the illumination section 11 corresponding to the illumination means illuminates a code to be imaged. The peak value sensing section 13 corresponding to the peak value sensing means senses the maximum value of illumination from a first area and the minimum value of illumination from a second area on the imaging screen. An area 152 where a decrease in the luminance due to shading is smaller than the allowed value even for the allowed lifting or tilting of the imaging device is set as the second area in order to prevent the minimum value from being affected by shading as shown in FIG. 37B. Then, the binarizing section 15 corresponding to the binarizing means calculates a threshold value from the sensed maximum and minimum values of luminance and binarizes the imaged code using the threshold value.

This configuration prevents the minimum value from being affected by shading and enables stable binarization. Therefore, it is possible to prevent the disappearance of markers 108 or the occurrence 116 of erroneous markers 116 due to binarization failure.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed:

1. An information reproducing system which optically reads a dot code from an information recording medium and reproduces the information, the information recording medium on which an optically readable dot code has been recorded, the dot code composed of blocks arranged in an array, each block including at least a data code made up of data dots arranged according to the contents of data related to the information to be reproduced, a pattern code placed so as to have a specific positional relationship with the data dots and made up of pattern dots to determine reading points for the data dots, and markers to sense the pattern dots placed so as to have a specific positional relationship with the pattern dots and recorded in a way different from the data dots and the pattern dots, the information reproducing system comprising:

image input means for shooting the dot code on the information recording medium;

representative marker sensing means for sensing only one of the markers as a representative marker on an imaging frame shot by said image input means;

pattern dot sensing means for sensing the pattern dots on the basis of the position of said one of the markers which is sensed as the representative marker by said representative marker sensing means;

data dot reading point determining means for determining a reading point for each data dot on the basis of the positions of the pattern dots sensed by said pattern dot sensing means;

data reading means for reading each data dot at the reading point determined by said data dot reading point determining means; and data reproducing means for concatenating the data items in each block read by said data reading means and reproducing the information;

wherein said pattern dot sensing means includes:

pattern dot sensing reference point setting means for, on the basis of the position of said one of the markers which is sensed as the representative marker by said representative marker sensing means, setting a pattern dot sensing reference point serving as a reference position to sense the pattern dots, pattern dot format storage means for storing the positional relationship between each pattern dot in the pattern code and the pattern dot sensing reference point in the form of a pattern dot format, and pattern dot reading vector storage means for storing a pattern dot reading vector to determine sensing points for the pattern dots on the basis of the pattern dot sensing reference point, and wherein said pattern dot sensing means is designed to move the sensing point for the each pattern dot according to the pattern dot reading vector, starting from the pattern dot sensing reference point on the basis of the stored pattern dot format.

2. The information reproducing system according to claim 1, wherein said representative marker sensing means is designed to set in the central portion of the imaging frame an area where at least one of the markers constituting a block shot in a readable condition by said image input means can be sensed and sense the single marker in the set area.

3. The information reproducing system according to claim 2, wherein said representative marker sensing means sets the first sensed marker candidate as a representative marker.

4. The information reproducing system according to claim 2, wherein said representative marker sensing means is designed to sense marker candidates and set the marker candidate whose feature value is closest to a specific target value as a representative marker.

5. The information reproducing system according to claim 1, wherein said representative marker sensing means sets the first sensed marker candidate as a representative marker.

6. The information reproducing system according to claim 1, wherein said representative marker sensing means is designed to sense marker candidates and set the marker candidate whose feature value is closest to a specific target value as a representative marker.

7. The information reproducing system according to claim 1, wherein said pattern dot sensing means further includes:

pattern dot sensing feasibility judging means for, before pattern dot sensing, judging whether a point obtained by extending the pattern dot reading vector by one block from the pattern dot sensing reference point exists in the frame shot by said image input means.

8. The information reproducing system according to claim 1, wherein said pattern dot sensing means includes:

adjacent marker sensing means for sensing a marker adjacent to the representative marker on the basis of the position of the representative marker sensed by said representative marker sensing means, and pattern dot reading vector computing means for applying a marker pair made up of the representative marker and the adjacent marker to one of the marker pairs constituting the block and calculating a pattern dot reading vector from their positional relationship.

9. The information reproducing system according to claim 8, wherein said adjacent marker sensing means senses an adjacent marker in at least one adjacent marker sensing area determined by the size and position of the representative marker sensed by said representative marker sensing means and a predetermined allowed skew angle.

10. The information reproducing system according to claim 8, wherein said pattern dot reading vector computing means further includes pattern dot reading vector recomputing means for, when pattern dots cannot be sensed on the basis of the calculated pattern dot reading vector, applying a marker pair made up of the representative marker and the adjacent marker again to another marker pair constituting the block and recomputing the pattern dot reading vector.

11. The information reproducing system according to claim 1, wherein said pattern dot sensing means further includes pattern dot sensing position correcting means for correcting the pattern dot sensing position each time a pattern dot is sensed, in order to sense a pattern dot reliably.

12. The information reproducing system according to claim 11, wherein said pattern dot sensing means further includes means for, when a first pattern dot is sensed, calculating its centroid, correcting the pattern dot sensing position on the basis of the position of the centroid of the calculated pattern dot, and sensing a pattern dot again.

13. The information reproducing system according to claim 1, wherein said pattern dot sensing means senses pattern dots included in pattern codes sharing the pattern dot sensing reference point set by said pattern dot sensing reference point setting means.

14. The information reproducing system according to claim 1, wherein said data dot reading point determining means includes:
  reading reference value computing means for calculating a reading reference point and a reading reference vector in data dots with a method of least on the basis of the positions of the pattern dots sensed by said pattern dot sensing means, and
  reading point computing means for calculating reading points for the data dots on the basis of the reading reference point and reading reference vector calculated by said reading reference value computing means.

15. The information reproducing system according to claim 17, wherein said reading point computing means calculates reading points for block data using reading reference points and reading reference vectors.

16. The information reproducing system according to claim 14, wherein:
  said pattern dot sensing means includes:
    pattern dot sensing reference point setting means for setting a pattern dot sensing reference point serving as a reference position to sense the pattern dots on the basis of the position of said one of the markers which is sensed by said representative marker sensing means,
    pattern dot format storage means for storing the positional relationship between each pattern dot in the pattern code and the pattern dot sensing reference point in the form of a pattern dot format, and
    pattern dot reading vector storage means for storing a pattern dot reading vector to determine a sensing point for the pattern dots on the basis of the pattern dot sensing reference point, and
    said pattern dot sensing means is designed to sense the pattern dots by moving the sensing point for the pattern dot according to the pattern dot reading vector, starting from the pattern dot sensing reference point, on the basis of the stored pattern dot format, and
  said pattern dot reading vector storage means is designed to calculate a pattern dot reading vector according to the reading reference vector calculated by said reading reference value computing means and store the resulting vector.

17. The information reproducing system according to claim 16, wherein said pattern dot reading vector storage means is designed to relate the reading reference vectors calculated by said reading reference value computing means to the corresponding reading reference points, store them as pattern dot reading vectors, and selectively apply the stored pattern dot reading vectors in the next imaging frame on the basis of the positional relationship between the pattern dot sensing reference point and the stored reading reference point.

18. An information reproducing system which optically reads a dot code from an information recording medium and reproduces the information, the information recording medium on which an optically readable dot code has been recorded, the dot code composed of blocks arranged in an array, each block including at least a data code made up of data dots arranged according to the contents of data related to the information to be reproduced, a pattern code placed so as to have a specific positional relationship with the data dots and made up of pattern dots to determine reading points for the data dots, and markers to sense the pattern dots placed so as to have a specific positional relationship with the pattern dots and recorded in a way different from the data dots and the pattern dots, the information reproducing system comprising:
  image input means for shooting the dot code on the information recording medium;
  representative marker sensing means for sensing only one of the markers as a representative marker on an imaging frame shot by said image input means;
  pattern dot sensing means for sensing the pattern dots on the basis of the position of said one of the markers which is sensed as the representative marker by said representative marker sensing means;
  data dot reading point determining means for determining a reading point for each data dot on the basis of the positions of the pattern dots sensed by said pattern dot sensing means;
  data reading means for reading each data dot at the reading point determined by said data dot reading point determining means; and
  data reproducing means for concatenating the data items in each block read by said data reading means and reproducing the information;
  wherein said pattern dot sensing means includes:
    pattern dot sensing reference point setting means for setting a pattern dot sensing reference point serving as a reference position to sense the pattern dots on the basis of the position of said one of the markers which is sensed as a representative marker by said representative marker sensing means,
    pattern dot format storage means for storing the positional relationship between each pattern dot in the pattern code and the pattern dot sensing reference point in the form of a pattern dot format, and
    pattern dot reading vector storage means for storing a pattern dot reading vector to determine sensing points for the pattern dots on the basis of the pattern dot sensing reference point, and
  wherein said pattern dot sensing means senses the pattern dots by moving the sensing point for the pattern dot according to the pattern dot reading vector, starting from the pattern dot sensing reference point, on the basis of the stored pattern dot format,
  said data dot reading point determining means includes reading reference value computing means for calculating a reading reference point and a reading reference vector from the positions of the pattern dots sensed by said pattern dot sensing means,
  said pattern dot sensing means further includes block skip vector computing/storage means for calculating a block skip vector on the basis of the reading reference vector calculated by said reading reference value computing means and storing the block skip vector, and
  said pattern dot sensing reference point setting means is designed to set the next pattern dot sensing reference point on the basis of the reading reference point calculated by said reading reference value computing means and the block skip vector computed and stored by said block skip vector computing/storage means.

19. The information reproducing system according to claim 18, wherein said block skip vector computing/storage means is designed to relate the calculated block skip vectors on the present imaging screen to the corresponding reading reference points and store them and selectively apply the stored block skip vectors on the next imaging screen on the basis of the positional relationship between reading reference points and the stored reading reference points.

20. An information reproducing system which optically reads a dot code from an information recording medium and reproduces the information, the information recording medium on which an optically readable dot code has been recorded, the dot code composed of blocks arranged in an array, each block including at least a data code made up of data dots arranged according to the contents of data related to the information to be reproduced, a pattern code placed so as to have a specific positional relationship with the data dots and made up of pattern dots to determine reading points for the data dots, and markers to sense the pattern dots placed so as to have a specific positional relationship with the pattern dots and recorded in a way different from the data dots and the pattern dots, the information reproducing system comprising:

image input means for shooting the dot code on the information recording medium;

representative marker sensing means for sensing only one of the markers as a representative marker on an imaging frame shot by said image input means;

pattern dot sensing means for sensing the pattern dots on the basis of the position of said one of the markers which is sensed as the representative marker by said representative marker sensing means;

data dot reading point determining means for determining a reading point for each data dot on the basis of the positions of the pattern dots sensed by said pattern dot sensing means;

data reading means for reading each data dot at the reading point determined by said data dot reading point determining means; and data reproducing means for concatenating the data items in each block read by said data reading means and reproducing the information, wherein the dot code has blocks with the same contents placed at regular intervals of several blocks and recorded in such a manner that part of them may overlap with each other on an imaging frame by said image input means, said data dot reading point determining means includes:

reading reference value computing means for calculating a reading reference point and a reading reference vector from the positions of the pattern dots sensed by said pattern dot sensing means, and divided block data reading point computing means for calculating the data dot reading points for blocks with the same contents part of which are missing because they partially cover the end of the imaging screen, from the reading reference point and reading reference vector calculated by said reading reference value computing means, and wherein said data reading means includes divided block data concatenation reading means for reading data dots on the basis of the reading points calculated by said divided block data reading point computing means and concatenating the divided block data items into a single block data item.

21. The information reproducing system according to claim 20, wherein said data dot reading point determining means is designed to calculate a reading reference point and a reading reference vector from the block and the positions of pattern dots near the block to calculate reading points for the block data part of which is missing because the block partially covers the end of the imaging frame.

22. The information reproducing system according to claim 20, wherein said divided block data reading point computing means is designed to extrapolate a reading reference point and reading reference vector calculated from a pattern code imaged without any loss to calculate reading points for the block data part of which is missing because the block partially covers the end of the imaging screen.

23. An information reproducing system which optically reads a dot code from an information recording medium and reproduces the information, the information recording medium on which an optically readable dot code has been recorded, the dot code composed of blocks arranged in an array, each block including at least a data code made up of data dots arranged according to the contents of data related to the information to be reproduced, a pattern code placed so as to have a specific positional relationship with the data dots and made up of pattern dots to determine reading points for the data dots, and markers to sense the pattern dots placed so as to have a specific positional relationship with the pattern dots and recorded in a way different from the data dots and the pattern dots, the information reproducing system comprising:

image input means for shooting the dot code on the information recording medium;

representative marker sensing means for sensing only one of the markers as a representative marker on an imaging frame shot by said image input means;

pattern dot sensing means for sensing the pattern dots on the basis of the position of said one of the markers which is sensed as the representative marker by said representative marker sensing means;

data dot reading point determining means for determining a reading point for each data dot on the basis of the positions of the pattern dots sensed by said pattern dot sensing means;

data reading means for reading each data dot at the reading point determined by said data dot reading point determining means; and data reproducing means for concatenating the data items in each block read by said data reading means and reproducing the information, wherein said image input means includes:

lighting means for lighting dot codes to be imaged, imaging means for shooting dot codes, peak value sensing means for sensing the maximum value and minimum value of luminance from the frame shot by said imaging means, exposure control means for controlling the amount of lighting by said lighting means or the amount of exposure, such as the exposure time, by said imaging means so that the maximum value of luminance sensed by said peak value sensing means may lie in a specific range, and binarizing means for binarizing the frame shot by said imaging means according to a threshold value determined on the basis of the maximum value and minimum value of luminance sensed by said peak value sensing means, and wherein said peak value sensing means is designed to sense the maximum value from an area where an increase in the luminance due to direct reflection is smaller than a specific allowed value even for an allowed lifting or tilting of the imaging device.

24. An information reproducing system which optically reads a dot code from an information recording medium and reproduces the information, the information recording medium on which an optically readable dot code has been recorded, the dot code composed of blocks arranged in an array, each block including at least a data code made up of data dots arranged according to the contents of data related to the information to be reproduced, a pattern code placed so as to have a specific positional relationship with the data dots and made up of pattern dots to determine reading points for the data dots, and markers to sense the pattern dots placed so as to have a specific positional relationship with the pattern dots and recorded in a way different from the data dots and the pattern dots, the information reproducing system comprising:

image input means for shooting the dot code on the information recording medium;

representative marker sensing means for sensing only one of the markers as a representative marker on an imaging frame shot by said image input means;

pattern dot sensing means for sensing the pattern dots on the basis of the position of said one of the markers which is sensed as the representative marker by said representative marker sensing means;

data dot reading point determining means for determining a reading point for each data dot on the basis of the positions of the pattern dots sensed by said pattern dot sensing means;

data reading means for reading each data dot at the reading point determined by said data dot reading point determining means; and data reproducing means for concatenating the data items in each block read by said data reading means and reproducing the information;

wherein said image input means includes:
      lighting means for lighting dot codes to be imaged,
      imaging means for shooting dot codes,
      peak value sensing means for sensing the maximum value and minimum value of luminance from the frame shot by said imaging means,
      exposure control means for controlling the amount of lighting by said lighting means or the amount of exposure, such as the exposure time, by said imaging means so that the maximum value of luminance sensed by said peak value sensing means may lie in a specific range, and
      binarizing means for binarizing the screen shot by said imaging means according to a threshold value determined on the basis of the maximum value and minimum value of luminance sensed by said peak value sensing means, and wherein said peak value sensing means is designed to sense the minimum value from an area where a decrease in the luminance due to shading is smaller than a specific allowed value for an allowed lifting or tilting of the imaging device.

* * * * *